United States Patent [19]

Uchiyama et al.

[11] 4,230,402
[45] Oct. 28, 1980

[54] FLASH EXPOSURE CONTROL SYSTEM

[75] Inventors: Takashi Uchiyama, Yokohama; Zenzo Nakamura, Urawa; Shohei Ohtaki, Yokohama, all of Japan

[73] Assignee: Canon Kabushiki Kaisha, Tokyo, Japan

[21] Appl. No.: 883,298

[22] Filed: Mar. 3, 1978

Related U.S. Application Data

[63] Continuation-in-part of Ser. No. 855,339, Nov. 28, 1977, abandoned.

[30] Foreign Application Priority Data

Nov. 30, 1976 [JP] Japan .................. 51-143916
Mar. 3, 1977 [JP] Japan .................. 52-23131

[51] Int. Cl.³ .................. G03B 15/05; G06C 3/00
[52] U.S. Cl. .................. 354/33; 354/128; 354/149; 235/64.7
[58] Field of Search .................. 354/32–34, 354/60 F, 127, 128, 139, 145, 149, 289; 315/241 P, 241 S; 362/5, 8, 4; 235/64.7

[56] References Cited

U.S. PATENT DOCUMENTS

| 2,901,671 | 8/1959  | Most ........................ 354/127 X |
| 3,644,818 | 2/1972  | Paget ........................ 315/241 S |
| 3,857,064 | 12/1974 | Vital et al. ................ 315/241 P |
| 3,982,117 | 9/1976  | Betlejewski ................ 362/2 |
| 4,023,188 | 5/1977  | Ueda et al. ................ 315/241 P |
| 4,047,194 | 9/1977  | Nakamura et al. .......... 354/149 |
| 4,078,240 | 3/1978  | Kaneko et al. ............. 315/241 P |

Primary Examiner—L. T. Hix
Assistant Examiner—William B. Perkey
Attorney, Agent, or Firm—Toren, McGeady and Stanger

[57] ABSTRACT

The present invention relates to a device for flash light photography and, more particularly, to a device for flash light photography for adjustable light stroboscope. A major feature of the present invention is that the adjustable light condition of the stroboscope is rendered to be adjusted, based on the film speed and diaphragm value, independently of each other. Thus, when the film speed is made high, the responsive distance for light adjustment is elongated.

6 Claims, 13 Drawing Figures

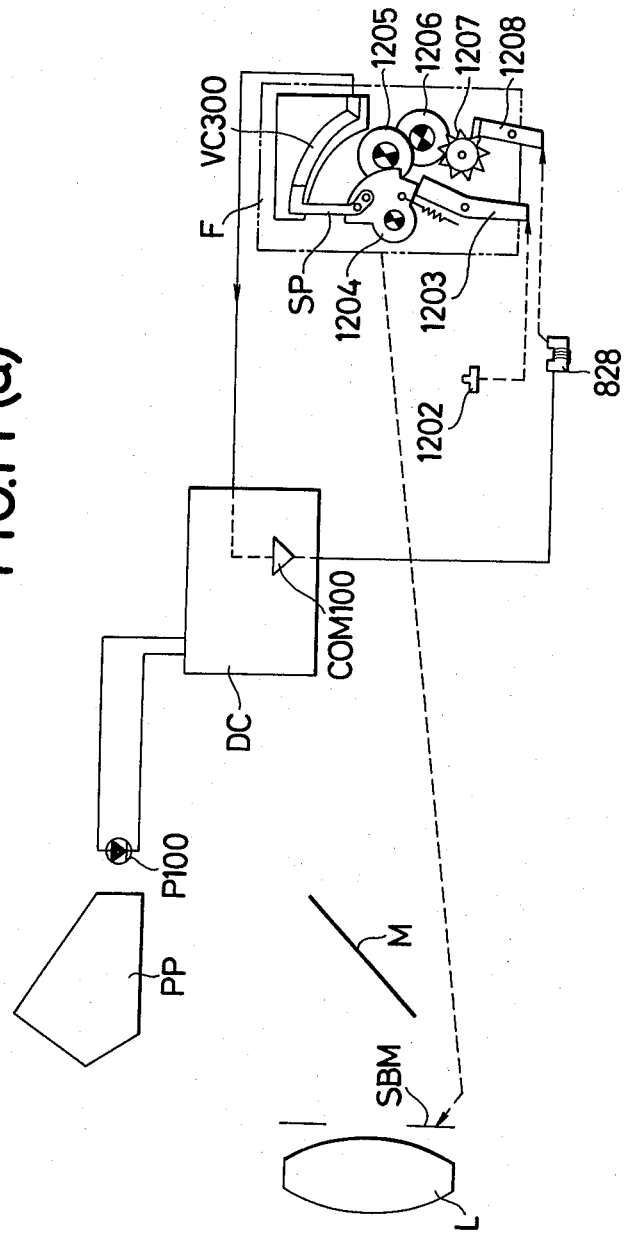

FLASH EXPOSURE CONTROL SYSTEM

CROSS REFERENCE TO RELATED APPLICATION

This application is a continuation-in-part of our application Ser. No. 855,339, filed on Nov. 28, 1977, now abandoned.

BACKGROUND OF THE INVENTION

1. Field of the Invention

This invention relates to a variable light amount type electronic flash device, and, more particularly, to a device for flash light photography capable of extending the flash light photography responsive distance to the long distance side when a high speed film is used.

2. Description of the Prior Art

Conventionally, what is known as the adjustable light flash device (hereinafter referred to as the flash device) either attached to or incorporated in a camera may be divided into three main groups: (1) Illumination light from the stroboscopic device is projected to an object being photographed, and its reflected light is received either by the stroboscopic device or by the camera. When the amount of light integrated has reached a predetermined value, the production of light is automatically stopped. (2) The timing circuit for stopping the light production is previously adjusted in response to the setting of a distance between the stroboscopic device and the object so that the lighting of the stroboscopic device is caused to stop in correspondence to the set distance. (3) Before the lighting of the stroboscopic device, a preliminary lighting is performed. By the amount of light reflected, information of the object distance is obtained. In correspondence to this information, the energy of light emitted is adjusted.

When such adjustable light strobo devices are used, there gives rise to a problem that the diaphragm of the camera must be set by hand in conformance to the value specified by the exposure calculation plate of that strobo. There is no need to mention that this operation is troublesome. In addition thereto, when various films of different speed are used, there is a high possibility to commit faulty setting of the diaphragm. Further, even when a film of the same speed, for example, only ASA100 is used, the specified diaphragm value varies, depending upon the type of strobo, some requiring F4 and other F5.6, for example, so that the faulty setting of the diaphragm becomes high in possibility. Furthermore, in order to give selectivity of the depth of field in photography, it is known to provide an adjustable light strobo constructed so as to be capable of selecting a number of specified diaphragm values. In this case, the operation becomes more complicated with increase in the possibility of faulty setting.

In other words, the conventional adjustable light type flash device, as shown in FIG. 1, is constructed so as to automatically adjust the amount of light emitted in accordance with the object distance to effect proper exposure, while a predetermined diaphragm value is specified. In the figure, the abscissa is the object distance and the ordinate is the amount of light emitted from the flash device. The curves, a, b, c and d, show the various types of flash devices and how the emitted amount of light varies (or has to be varied) in response to the object distance, depending upon the switched position of a flash device of the type in which a number of specified diaphragm values are available.

In other words, for example, the "b" type flash device is required to set the diaphragm at F5.6 when a film of ASA100 is used, and is constructed so as to be automatically controlled in the emitted amount of light in accordance with the object distance, in a manner such that for an object at a distance of 1 meter, the emitted amount of light becomes $Po \times 2^2$ (corresponding to G. No. 5.6) and at a distance of 1.4 meter, $Po \times 2^3$ (corresponding to G. No. 8).

On the other hand, in the "c" type flash device, it is required to use not F5.6 but F4, and the construction is such that the emitted amount of light is controlled to $Po \times 2$ (corresponding to G. No. 4) for an object at a distance of 1 meter. Conversely speaking, as this type is constructed to emit $Po \times 2$ (corresponding to G. No.4) at 1 meter, it is required to use F4.

As will be seen from the foregoing, because of the availability of a wide variaty of conventional adjustable light type flash devices of different amount of light emission, the operator has the difficulty of resetting the specified diaphragm value each time the flash device to be used and the film speed which will be described later are changed. If he or she makes an error in evaluating it, no better than improper exposure can be obtained.

Further, in the above-described "b" type flash device, when a film of ASA50 is used, though the distance is the same, it is required to adjust the diaphragm value not to F5.6 but to F4 in order to double the amount of light reaching the film. In such a manner, there is need to readjust the diaphragm in response to the speed of the film to be used. This point also is troublesome.

Furthermore, a flash device capable of selectively controlling emitted amounts of light, in other words, having a great number of specified diaphragm setting positions is known. With such device, upon setting to a particular position, it becomes a particular type flash device as selected from the types, a, b, c and d mentioned above, so that the change-over setting of the diaphragm of the photographing lens becomes more troublesome to increase the possibility of performing faulty operation.

As has been described above, the conventional adjustable light strobo device has a drawback that each time the film speed setting is changed over, the diaphragm value must be reset. For this reason, it can be considered that the setting of film speed and the setting of diaphragm value are coupled with each other. With such a flash device, when a high-speed film (for example, ASA400) is used instead of a generally accepted film (for example ASA100), the size of diaphragm aperture of the photographing lens is caused to change in response to the set value of film speed. Therefore, the photographing limit of the longer distance side in flash light photography can not be extended despite the use of the high-speed film.

In other words, even in the adjustable light type flash device, as shown in FIG. 1, the produced light amount has an upper limit (in the illustrated example, $Po \times 2^6$) likewise as in the usual non-adjustable light type flash device. Further, because of the construction of the light adjusting part, it is natural that the lower limit of the produced light amount exists (in the illustrated example, Po). Therefore, with the "b" type flash device, or the selectively settable flash device when set to the "b" position, for example, the range of photographable distances is from 0.5 m to 4 m. By the way, when the film of ASA400 is used in combination with the flash device of the "b" type or set to the "b" position, though the object distance is the same, it is necessary to use not F5.6 but F11 so that the amount of light reaching the film surface is made as large as ¼ times that when ASA100 is used. For this reason, when the setting of film speed is coupled with the setting of diaphragm to automatically perform setting operation of the diaphragm as mentioned above, the change from ASA100 to ASA400 causes the change of the diaphragm from F5.6 to F11. Therefore, even when a film having as high a speed as ASA400 is used, the diaphragm of the photographing lens is closed down to an extent corresponding to the increase in film speed so that the range of photographable distances remains unchanged as shown in the figure thereby giving rise to a problem that photography can not be made for a long distant object.

This fact when considered in connection with the fact that the combination of the general non-adjustable light type flash device with the high-speed film makes it possible to photograph a long distant object can be well understood to be a very serious drawback for the adjustable light type strobo.

SUMMARY OF THE INVENTION

The present invention proposes a device for flash light photography which has eliminated the above-mentioned drawbacks of the adjustable light type strobo and has for an object to improve the handling characteristics of the device by simplifying the photographic condition setting in using various films when flash light photography is performed, and particularly to provide a setting device which enables extension of the flash light photographable distance to the long distance side when a high-sensitivity film is used.

Another object of the invention is to provide a flash device having film speed setting means and photographic lens diaphragm aperture setting means operable independently of each other to eliminate the above mentioned drawback and which makes ease the selection judgement of the set positions of the both setting means by displaying clearly the photographable distance range which varies depending upon the set positions of both setting means.

Each of the above mentioned objects of the present invention and other objects which are not particularly described will become more apparent by the detailed explanation which will be described in conjunction with the accompanying drawings and embodiments.

DESCRIPTION OF PREFERRED EMBODIMENTS

Figure 2:
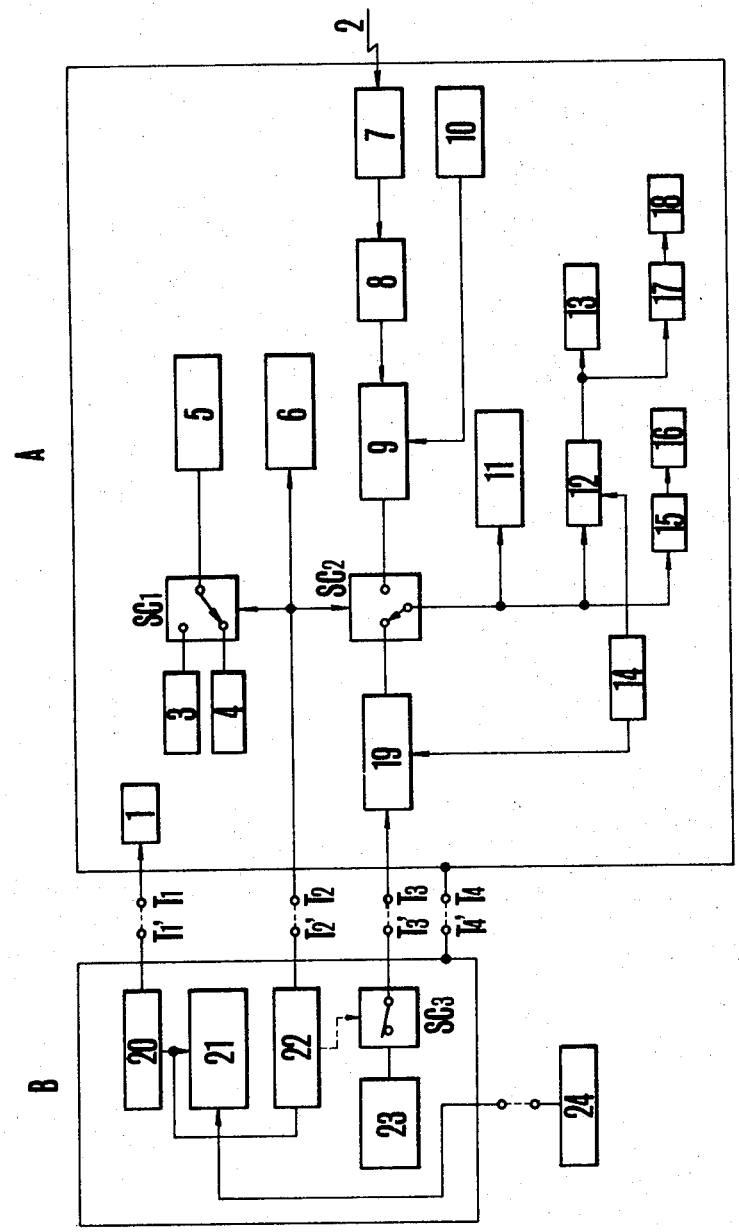
FIG. 2 is a block diagram of an automatic exposure control system for daylight and flash photography to which the present invention is applied.

FIG. 2 shows a combination of a photographic camera A which is provided with a shutter preselection automatic daylight diaphragm aperture value control mode and with a manually operating flash exposure control mode and a flash unit B of the invention. The camera A has four interconnection terminals T1 to T4 arranged on an accessary shoe 204 (see FIG. 5) to be brought into electrical contact with respective interconnection terminals T1' to T4' of the flash device which are assembled in a shoe 110 (see FIG. 3), when the unit B is attached to the camera A.

After a sufficient voltage as detected by block 22 is available to fire a flash tube 21, three changeover device SC1 to SC3 are operated by the output of detector 22 to be set in their illustrated positions for flash photography. Conversely when detector 22 produces no output because either of an insufficient voltage on a storage capacitor, or of the opening of a main switch 112 (see FIG. 3) of the device B, the first two change-over devices SC1 and SC2 are set to the opposite positions for daylight photography and the third change-over device SC3 is opened. In the daylight photography, the shutter 5 is controlled by the set value of 3 or 4, while the diaphragm control circuit is automatically adjusted in accordance with the object brightness level 7 and other various exposure control factors 10 which are combined by an exposure value computer 9. The exposure factors 10 include the shutter speed, film speed, and Avc compensation. As the sensor 7 receives light from an object being photographed through an objective lens of the camera at its full open aperture, the associated lens and the compensation for the error created during TTL light metering particularly by a bright lens or so-called curvature correction are taken into account through block 10 in deriving a daylight exposure value. The output of computer 9 represents the difference between the full open aperture and computed aperture values so that in order to display the light value by an indicator 13, it is necessary to provide a computer 12 for forming an absolute value F No. based on the computer output signal magnitude and full open aperture value, the latter signal being supplied from block 14. When the sign of the computer output as sensed by a first detector 15 is negative, or when the given photographic situation is of low light level, a first warning circuit for low light 16 is actuated, warning that even at the full open F value of the interchangeable lens mounted on the camera A, an under-exposure will result. 17 and 18 are a detector of a warning circuit for high brightness and a warning device for high brightness. When the absolute diaphragm value signal applied to 17 is excessive, 18 is actuated to warn that even at the minimum diaphragm value of the interchangeable lens mounted, an over-exposure will result.

Upon advent of a charging completion signal 22 on the change-over devices SC1, SC2 and SC3, the occurrence of which is displayed by the charging completion display means 6, a fixed-flash exposure time (e.g. 1/60 second) setting means 4 is selected by SC1 to be connected with the shutter control circuit 5, and the computer 9 is cut off by SC2 from connection with the diaphragm control circuit 11, but instead a diaphragm aperture value setting means 23 provided in the flash unit B is selected for cooperation with the diaphragm control circuit 11 of the camera A through a subtracter 19 which functions to substract the absolute diaphragm value signal from the full open aperture value of block 14 and of which the output is thus made equivalent in nature to that of the computer 9.

At a time when the shutter of the camera A is fully opened to close a synchro-switch 1, a trigger circuit 20 is operated to trigger a flash tube firing circuit 21, thereby the electrical energy on the storage capacitor is discharged through the flash tube with the simultaneous occurrence of emission of flash light. Light reflected from the object being photographed with flash illumination is sensed by a photosensitive element included in a distance responsive information output device 24. When the amount of light integrated by it has reached a predetermined value, the production of flash light from the firing circuit 21 is stopped at a point during the time when the shutter is fully open, and then the shutter is closed, thereby providing a correct flash exposure. The distance responsive information output device 24 may be otherwise designed by employing a so-called "follow-focus" mechanism instead of the photosensitive element connected in an integrating circuit.

Figure 3:
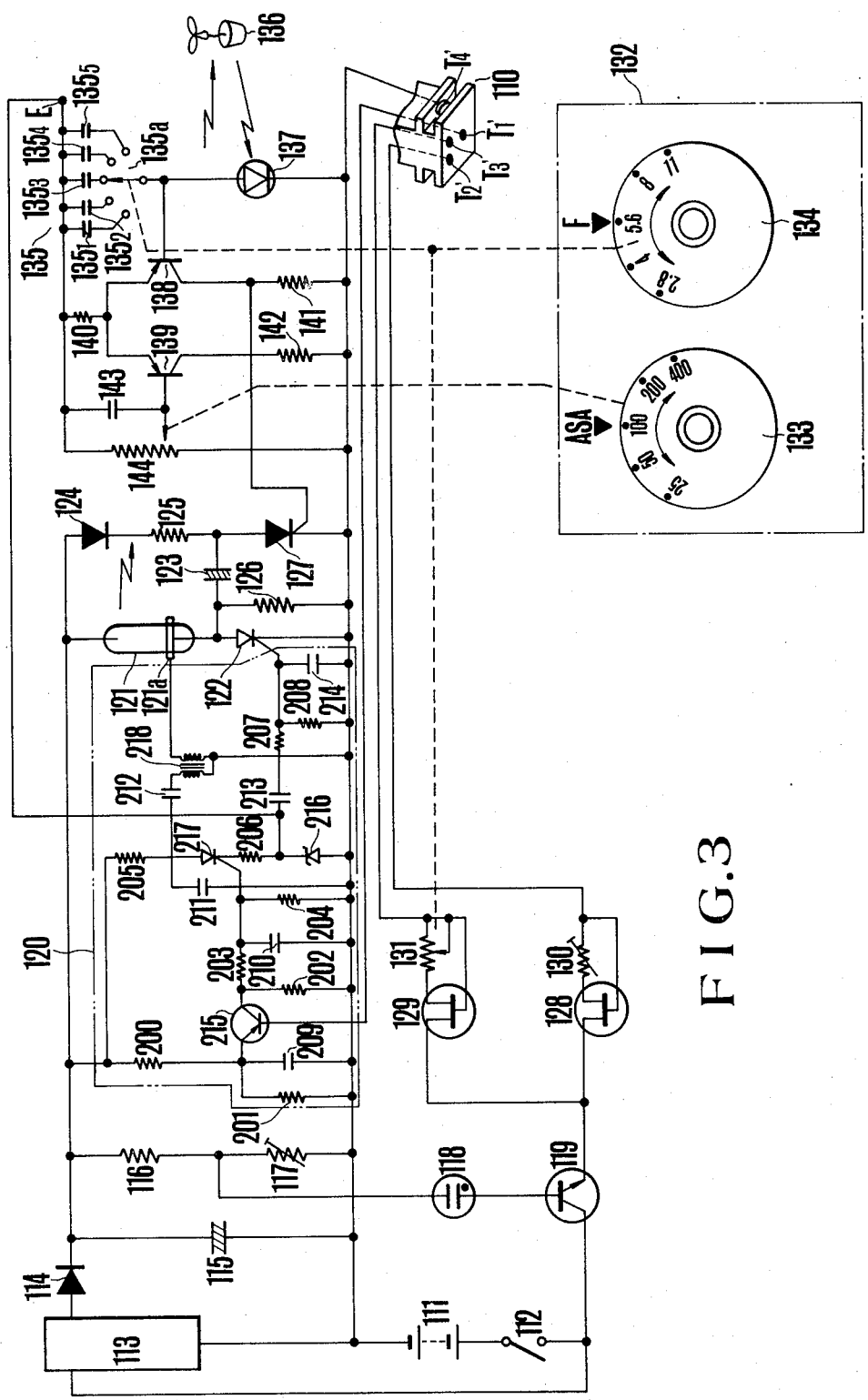
FIG. 3 is a schematic electrical circuit diagram of one embodiment of a flash unit according to the present invention.

FIG. 3 shows a specific embodiment of the flash unit B of FIG. 2 according to the present invention. The device B includes an electrical power source or battery 111 of relatively low voltage connected through a main switch 112, a booster 113 and a rectifying diode 114 to charge a storage capacitor 115. The voltage on the storage capacitor 115 is divided by a series-connected resistors 116 and 117 upon detection of attainment to the firing voltage level by a neon tube 118 to actuate a sub-switching transistor 119 controlling operation of the change-over devices SC1 to SC3. This voltage also appears across a flash discharge tube 121 provided that a silicon controlled rectifier (SCR) 122 connected in a discharge circuit therefor is in the conducting state.

A trigger circuit enclosed within the dashed outline 120 includes a transistor 215 having a base electrode connected through the terminals T1'-and-T1 connection to the synchro-switch 1 of FIG. 2, a second SCR 217 having a gating control input connected through a differentiating circuit to the collector electrode of the transistor 215, and a transformer 218 of which the primary coil is connected through a capacitor 212 to the anode of SCR 217. The secondary coil of transformer 218 is connected to a trigger electrode 121a of the tube 212. Connected between the cathode of SCR 217 and the negative terminal of battery 111 are a resistor 206 and a Zener diode 216, these parts being connected in series with each other. A point on connection between the resistor 206 and diode 216 is connected through a capacitor 213 and a differentiating circuit to the gating control input of SCR 122. During a time interval dependent upon the time constant of a timing circuit of the resistor 206 and a capacitor 211, a constant voltage E appearing across the Zener diode 216 is utilized as a voltage source for the distance responsive information output device 24 (FIG. 2).

This device 24 has a control panel 132 constituting part of the housing of the device B and on which are separately arranged two factor setting means in the form of dials 133 and 134 having film speed and diaphragm value scales respectively and rotatable by hand independently of each other upon registry of respective ones of the indicia with stationary marks "ASA" and "F" to set these factors in a variable resistor 144 and a timing capacitor array 135 respectively. This array consists of five capacitors $135_1$ to $135_5$ connected at their one poles by way of a common negative bus to the cathode of the Zener diode 216 and arranged at their opposite poles to be selectively connected to a photosensitive element 137 by a one-pole five-throw switch 135a of which the pole is cooperative with the diaphragm value setting dial 134. The photosensitive element 137 is positioned to receive light from a subject 136 being photographed with flash illumination. The variable resistor 144 is incorporated in a switching circuit of the difference amplifier type. This circuit further includes a first transistor 138 having a base connected to a junction between the timing capacitor 135 and the element 137 and a second transistor 139 having a base connected to a slider of the variable resistor 144.

A charging circuit for a commutation capacitor 123 comprises a diode 124 connected at the anode to the positive bus, a resistor 125 connected between the diode 124 and the commutation capacitor 123, and a resistor 126 connected at one end to a point on connection between the commutation capacitor 123 and the cathode of the tube 121, the opposite end of which is connected to the negative bus. Connected in a discharging circuit for the commutation capacitor 123 is a third SCR 127 having a gating control input connected to the output of the switching circuit 138–144 of the device 24.

To introduce a firing ready signal 22 from the unit B to the camera A, there is provided a circuit comprising a field effect transistor 128 having a drain connected to the emitter of the transistor 119, having a source connected through a variable resistor 130 to the interconnection terminal T2' in the shoe 110 and having a substrate electrode connected across the resistor 130. The transistor 128 and variable resistor 130 also serve as a constant current source. To introduce the preselected diaphragm aperture value from the unit B to the camera A, there is provided a circuit comprising a field effect transistor 129 having a drain connected to the emitter of the transistor 119, having a source connected to the interconnection terminal T3' in the shoe 110 through a variable resistor 131 with its slider being cooperative with the diaphragm value setting dial 134, and having a substrate electrode connected both to the slider and to the terminal T3'. The transistor 129 and the variable resistor 131 also serve as a constant current source.

Figure 5:
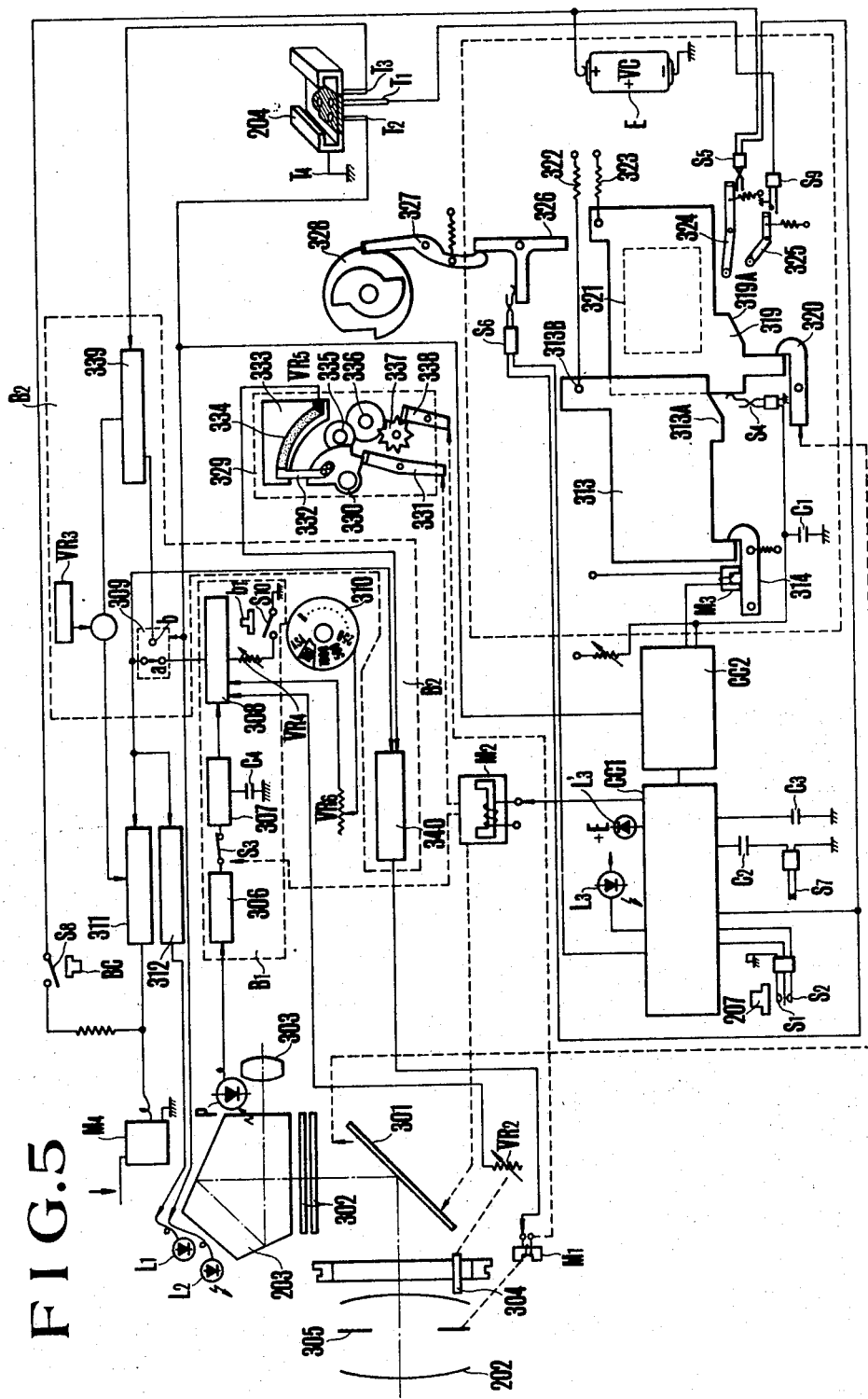
FIG. 5 is a schematic diagram, partly in block form, of an example of that section of an exposure control apparatus which is incorporated in a camera.

With the foregoing description of the circuits of FIG. 3 in mind, their operation will be fully described below. After the flash unit B has been attached to the camera while the shoe 110 has been inserted into and seated in the accessory shoe 204 (FIG. 5) with assurance that the terminals T1' to T4' of the shoe 110 are in electrical contact with the terminals T1 to T4 of the shoe 204, the operator will first turn the film speed and diaphragm value setting dials 133 and 134 to place desired ones of the indicia, for example, 100 in ASA and 5.6 in F-stop in registry with the respective marks, thereby the resistance of the variable resistor 144 is adjusted to a value for ASA 100, and, as F5.6 is registered, the third timing capacitor $135_3$ is selected by the switch 135a for connection with the photosensitive element 137, and the resistance of variable resistor 131 is adjusted to a value for F5.6. Next, when the power switch 112 is closed, the voltage of the battery 111 after increased to a high level by the booster 113 is applied to the storage capacitor 115, thereupon the voltage across the storage capacitor 115 starts to gradually increase, being capable of reaching a level for firing of the tube 121 during a time interval. At the termination of duration of this time interval, the neon tube 118 is rendered conducting and then the transistor 119 is operated to switch the camera A from the daylight of the flash mode which is indicated by the display 6 or a light emitting diode L2 to be described later in detail (FIG. 5). Further, a current representative of F5.6 set in the resistor 131 is applied through the terminal T3' to the shoe 110, thereby the diaphragm is controlled to F5.6. The display of this aperture value by the indicator 13 can be viewed near or in the field of view of the finder along with the display of the firing ready signal 22 (FIG. 2).

Upon depression of a shutter button, the front curtain of the focal plane shutter runs down to an aperture fully open position at which the synchro-switch 1 is closed, thereby the base of the transistor 215 is connected to the circuit earth through the terminals T1'- and-T1 connection. As the transistor 215 is turned on, the charge stored on a capacitor 209 is applied to the gating control input of SCR 217, and then the charge on a capacitor 211 is discharged through the so-conducted SCR 217, resistor 206 and Zener diode 216 with appearance of a constant voltage across the Zener diode 216 by which the device 24 is rendered operative. Conduction of the SCR 217 also causes a transient current from a capacitor 212 to flow through the primary coil of the transformer 218 providing an extremely high voltage on the secondary coil to strike the flash tube 121. At the same time, SCR 122 is also rendered conducting by the output of Zener diode 216 so that at a point in time of trigger of the tube 121, the electrical energy stored on the storage capacitor 115 starts to be discharged through the tube 121, and SCR 122 with emission of an extremely intense flash of light.

The flash light is projected onto the subject 136 being photographed, while the reflected light from the subject 136 being incident upon the photo-responsive element 137 having a resistance functionally related to the light intensity of the subject 136. When the output of the timing circuit $135_3$ and 137 has reached a level which was preadjusted by the variable resistor 144, the difference amplifier 138-144 is inverted to actuate the third SCR 127 for conduction, thereby the charge on the commutation capacitor 123 is allowed to flow through the resistor 126 with application of opposite bias voltage across the first SCR 122, resulting in the termination of the duration of energization of the tube 121 at a point during the time when the shutter is fully open. Thus, a correct flash exposure is obtained.

Figure 1:
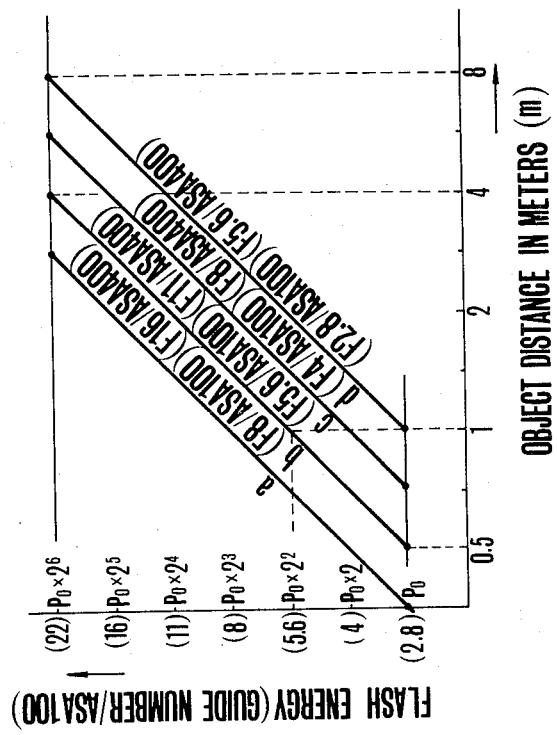
FIG. 1 is a graph showing various modes of variation of flash energy with distance between a camera and a subject being photographed, depending upon the guide number of the associated flash unit.

Consideration will now be given to the relationship between the photoflash range and the combined setting of the film sensitivity and aperture value by reference to FIG. 1. Now assuming that the set values of film sensitivity and exposure aperture by the dials 133 and 134 are respectively ASA100 and F5.6, and that the full light energy available from the flashed tube is $Po \times 2^6$, then the function relating variation of flash energy to the distance between the subject and the camera may be defined by "b" curve, and a correct flash exposure value can be derived over a range of distances from 0.5 to 4 meters. In more detail, for a subject at a distance of 1 meter, the integrator circuit 135 and 137 produces a time variable output voltage capable of reaching a level equal to that appearing at the base of the transistor 139 during a time interval which corresponds to an integrated light of $Po \times 2^2$. And, for a subject at a distance of 4 meters, the time interval of energization of the flash tube 121 takes at a maximum value corresponding to the full amount of flash light, that is, $Po \times 2^6$, as the flash exposure time is fixed. Thus, the combined setting of ASA100 and F5.6 leads to the establishment of a dynamic range of flash control up to 4 meters.

Now, it is intended for the photographer to use a film having a sensitivity of ASA400 for the purpose of photographing a subject at a distance longer than 4 meters. Then, he will turn the film sensitivity dial 133 to place an indicium "400" in registry with the mark, while the diaphragm aperture dial 134 remains unchanged in position for F5.6. In this case, the intensity of current flowing through the field effect transistor 129 does not change so that the diaphragm of the camera A is adjusted to F5.6. On the other hand, the variable resistor 144 is so adjusted that the base potential of the transistor 139 becomes higher than that occurring when ASA100 is set, and that when the integrated light for the same subject distance has reached a level ¼ times that necessary with ASA100, the duration of energization of the flash is terminated. In more detail, the resultant amount of flash light is Po for a subject at a distance of 1 meter, $Po \times 2^4$ at 4 meters, and the maximum or $Po \times 2^6$ at 8 meters.

Such extension of the photoflash range to the longer side can be otherwise achieved by increasing the size of aperture opening by two F-stops, that is, to F2.8, while maintaining the film speed dial 133 unchanged from the position for ASA100. Upon setting the aperture dial 134 to F2.8, the variable resistor 131 is adjusted to a new value for F2.8 so that the diaphragm of the camera A is conformed therewith. Further, the third timing capacitor $135_3$ is cut off from connection with the photoresponsive element 137, and instead the first one is brought into connection therewith, so that the light response characteristics of the integrator circuit 135 and 137 is altered to decrease the time interval of energization of the flash. In more detail, for a subject at a distance of 1 meter, when the amount of flash light emitted has reached Po, the difference amplifier 138 to 144 is inverted. For a subject at a distance of 8 meters, when the full flash light has emitted, the potential of the base of the transistor 138 coincides with that of the base of the transistor 139. In other words, as the amount of light emitted becomes ¼ times as large as that for F5.6 at the same distance likewise as in changing the film speed (ASA), the corresponding distance is controlled based on the diaphragm value.

It will be appreciated that the flash unit of the invention enable the photographer to selectively use a great number of combinations of film speeds and exposure aperture values depending upon the adjusted energy level and the camera-to-subject distance. To increase the accuracy and reliability of flash exposure control, it is desired to display a particular range of distances for which a correct flash exposure value is derivable and which is resulted from a particular combination of film speed and exposure aperture values.

Figure 4A:
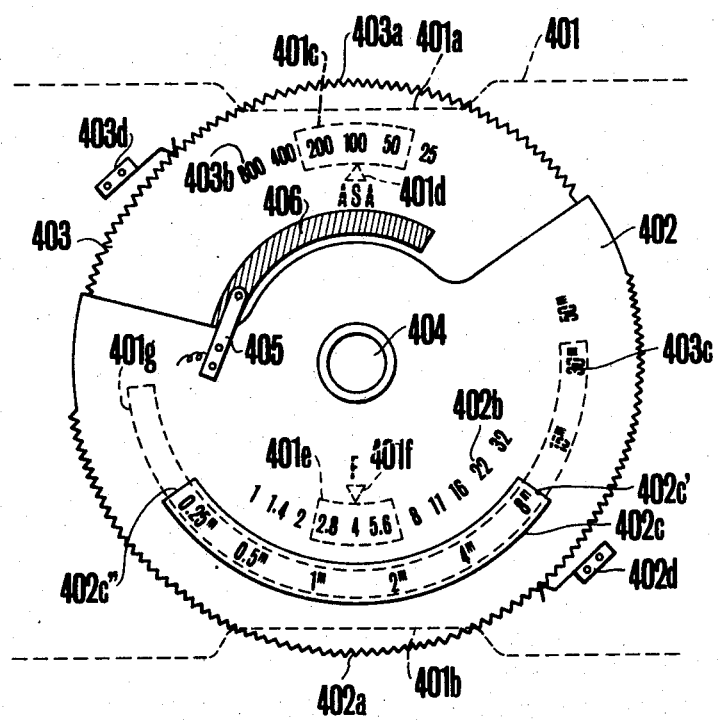
FIG. 4(a) is an elevational view of an assembly of film sensitivity and aperture value setting means constructed in accordance with the invention.

FIG. 4 shows an example of a two-factor setting mechanism provided with the display of a photoflash range in accordance with the present invention. Whilst FIG. 3 example of the setting mechanism is characterized by separate arrangement of the film speed and exposure aperture dials 133 and 134, this example of the setting mechanism of FIG. 4 is characterized by concentric arrangement of the two dials which permits the use of a single circuit element having a parameter related to the combined setting of two factors. In FIG. 4, a panel constituting part of the unit housing (or the camera housing when the unit is mounted within the camera) is indicated by phantom lines at 401 and is provided with two recesses 401a and 401b formed in opposite sides thereof and with three concentric arcuate slots 401c, 401e and 401g through which selected film speed and exposure aperture values and a so-adjusted photoflash range can be observed respectively. Mounted on the back face of the panel 401 are an aperture dial 402 and a film speed dial 403 rotatable independently of each other about a common shaft 404 fixedly mounted on the panel 401 in concentric relation to the slots 401c, 401e and 401g. The aperture dial 402 has a cutout positioned to clear the film speed window 401c and is provided with a diaphragm value scale 402b arranged to move under the window 401e therefor and with an oversloted arcuate window 402c having ends 402c' and 402c" and arranged in overlapped relation to the arcuate slot 401g and so dimensioned that an effective photoflash range is defined. The aperture dial 402 further includes a knurled portion 402a extending over the bottom of the recess 401b to control rotation of the dial 402 against the action of a click member 402 mounted on a stationary support. The film speed dial 403 has a knurled peripheral portion 403a extending over the bottom of the recess 401a to control rotation of the dial 403 against the action of a click member 403d therefor mounted on a stationary support and is provided with a film speed scale 403b arranged upon rotation of the dial 403 to place a graduation thereof in registry with a stationary index 401d cut on the front face of the panel 401 and a distance scale 403c arranged to cooperate with the range defining slot 402c. In this connection, it should be explained that when the dials 402 and 403 are independently turned to place indicia "F4" and "ASA100" in registry with respective indices 401f and 401d, the resultant photoflash range is defined with its upper limit being indicated by the right end 402c' of the slot 402c at a graduation designated "8" and with its lower limit being indicated by the left end 402c" at a graduation designated "0.25", as shown in FIG. 4(a). Thus, the distance scale from 0.25 to 50 meters enters the opening of the slot 402c at a portion ranging from 0.25 to 8 meters. It is to be noted here that as the light output of the flash unit is variable over a range of 1 to 32 in guide number/ASA100, the limits of the photoflash range are determined by dividing one and thirty-two by four, that is, $1 \div 4 = 0.25$ and $32 \div 4 = 8$, respectively.

Figure 4B:
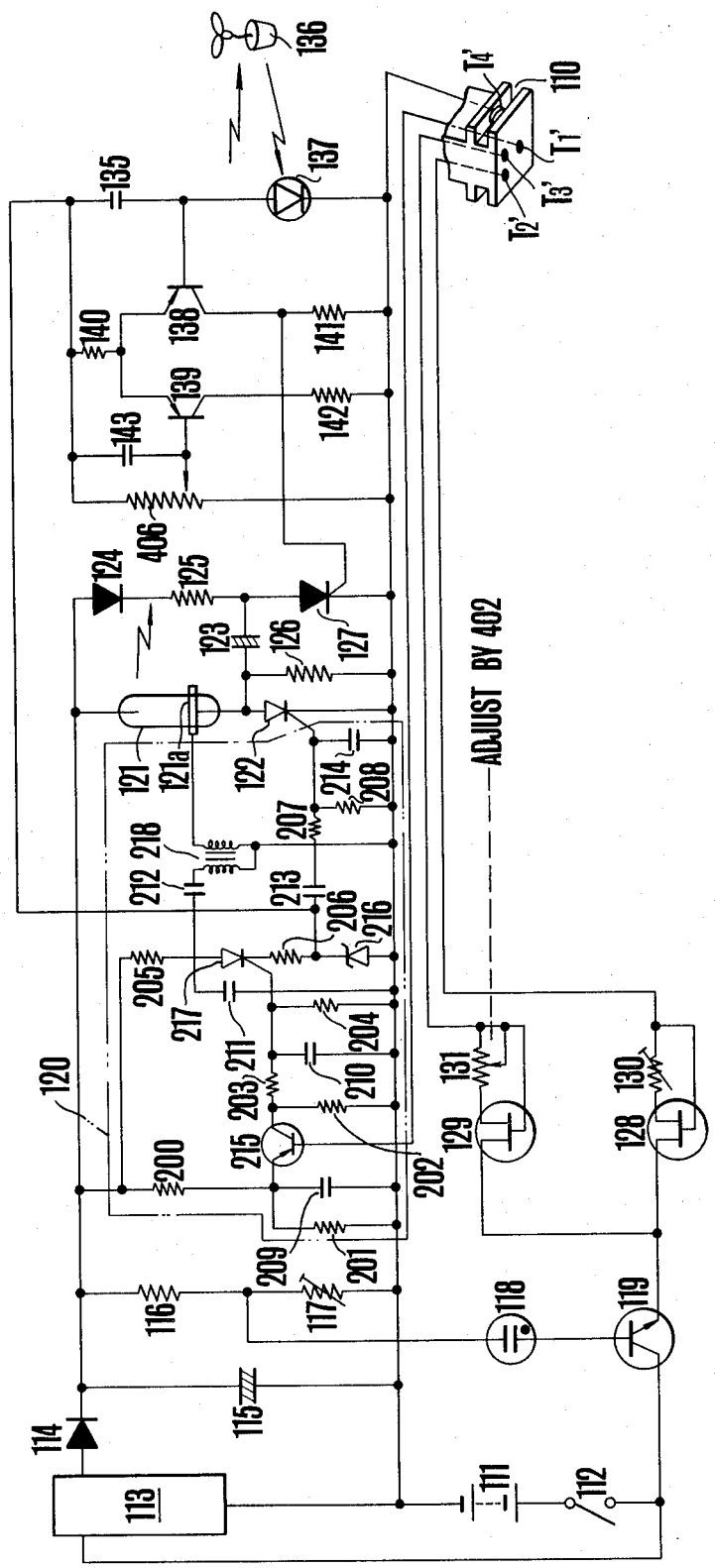
FIG. 4(b) is a similar diagram to that of FIG. 3 with modification for adaptation to use the setting means assembly of FIG. 4(a).

The film speed and exposure aperture values thus selected are combined by and set in a variable resistor with its slider 405 being fixedly mounted on and electrically insulated from the aperture dial 402 and with its arcuate track 406 of resistance material being fixedly mounted on and electrically insulated from the film speed dial 403. The slider 405 is connected to the base of the transistor 139 as shown in FIG. 4(b). The circuit of FIG. 4(b) is different from that of FIG. 3 in that the variable resistor 144 is replaced by the just mentioned variable resistor 405 and 406 and the timing capacitor array 135 is replaced by a single capacitor element. The variable resistor 131 is adjusted by the aperture dial 402 likewise as in FIG. 3.

Next, the operation of the device of FIG. 4 will be explained below.

Now assuming that a film speed of ASA100 and a diaphragm value of F5.6 are set by the respective dials 402 and 403, the resistor 406 is adjusted to have a value corresponding to the combination of ASA100 and F5.6, and the resistor 131 is also adjusted to have a value corresponding to F5.6. Accordingly, the diaphragm is controlled to F5.6, and the amount of light emitted is controlled based on the object distance in a manner as indicated by the "b" characteristics of FIG. 1 likewise in FIG. 3 embodiment. Now assuming that the dial 403 is operated to place ASA100 in registry with the index 401d, the resistance value of the resistor 406 corresponds to ASA400 and F5.6 so that the base potential of the transistor 139 becomes higher than that occurring when ASA100 and F5.6. For this reason, likewise as in FIG. 3 embodiment, when the amount of light emitted has reached Po for an object at a distance of 1 meter, the base potential of the transistor 138 reaches the base potential of the transistor 139, thereby the light emission is terminated. Further, in a similar manner, for an object at a distance of 4 meters, when the amount of light has reached $Po \times 2^4$, the light emission is terminated. The object distance for which the full light energy is emitted, in other words, the response distance becomes 8 meters, thus the response distance is extended as compared with the "b" characteristics of FIG. 1. At this time, a correct exposure is effected likewise as in FIG. 3 embodiment. When the diaphragm is changed in value, the light adjusting condition is determined based on the diaphragm value to control the response distance. As will be seen from the foregoing, the device for flash light photography according to the invention determins the light adjusting condition of the adjustable light strobo based on the speed of film used and the diaphragm value and performs adjustment of light in accordance with the response distance corresponding to said set values so that when a high-sensitivity film is used, the response distance can be extended.

FIG. 5 schematically shows an example of construction and arrangement of the basic parts of the camera A adapted for use with the flash unit B of the invention. Light entering through an objective lens 202 is reflected by a quick-return mirror 301 to a Flesnel lens with a focusing screen 302 on which an image of a subject to be photographed is formed. This image can be viewed through a pentaprism 203 and an eye-piece 303. Positioned behind the exit face of the pentaprism 203 is a photo-sensitive element P constituting part of a light metering circuit enclosed within a dashed line block B1 and which includes a sensor 306, a memory circuit 307 connected through a switch S3 to the sensor 306, and a computer circuit 308. The computer 308 is receptive of various exposure factors, for example, the maximum possible aperture value or F-number of the lens 202 as set in a variable resistor VR2 by a control pin 304 extending from the rear face of the lens mount, a preselected shutter speed as set in a variable resistor VR6 by a shutter dial 310, a K-value as set in a variable resistor VR4 and made operative by closure of a switch S10 with a button B1 to perform abnormal photography. The output of computer 308 is applied through a mode selection switch 309 to an exposure meter M4-driving circuit 311 and an out-of-range display control circuit 312. The output of circuit 312 is applied to a light-emitting diode L1 positioned in the field of view of the finder.

Block B2 includes a diaphragm aperture responsive variable resistor VR3, a flash exposure aperture computer 339, and a switching circuit 340 selectively responsive to the outputs of daylight and flash exposure value computers 308 and 339 for controlling the period of energization of an electromagnet M1 which is associated with an arresting mechanism for the diaphragm 305 scanning mechanism enclosed within a dashed line block 329. The scanning mechanism 329 includes a sector gear 330 arranged upon release from a latching lever 331 to turn clockwise while a slider 332 extending from the sector gear 330 is moved on a resistivity track 333, the parts 332 and 333 constituting a variable resistor VR5, a gear train 335 and 336 engaging with the sector gear 330 and terminating at a star gear 337, and an arresting lever 338 arranged to be brought into engagement with one of the teeth of the star gear 337 when the electromagnet M1 is actuated.

A block CC1 for controlling coordination of the various parts of the apparatus includes a camera actuating electromagnet control circuit B3, a mono-stable multi-vibrator B4, and a display control circuit B6 each of which will be described later in connection with FIG. 6. A shutter release button 207 is provided for controlling opening and closing operation of switches S1 and S2. A switch S7 is arranged to cooperate with a not shown self-timer setting dial.

A block CC2 for shutter control includes control circuits which will be described later in connection with FIG. 6. The output of block CC2 is applied to an electromagnet M3 controlling actuation of a rear shutter curtain 313 latching lever 314.

A shutter mechanism further includes a front curtain latching lever 320 arranged to cooperate with a mirror 301 control mechanism not shown and upon clockwise movement to permit the front curtain 321 to run down under the action of a spring 323 to an aperture 321 fully open position where a synchro-switch S9 is closed by an actuating lever 325 therefor as turned counter-clockwise by a tapered portion 319A of a front curtain support member. When the rear curtain 313 is released from the latching lever 314, it runs down under the action of a spring 322 to an aperture closed position where a power supply control switch S5 is opened by an actuating lever 324 as turned counter-clockwise by a tapered portion 313A of a rear curtain support member. Connected in series with the power supply control switch S5 is a battery check control switch S8 cooperative with a button BC upon closure to apply the voltage of a battery E to the meter M4. The shutter mechanism is associated with a film winding mechanism which includes a cam disc 328 arranged to rotate by 180° each time a winding lever is operated and to cooperate with a latching lever 327 therefor. When the shutter is closed, a three-armed lever 326 is turned counter-clockwise by a projection 313B of the rear curtain support member which in turn causes clockwise movement of the latching lever 327, resulting in disengagement from the control cam disc 238.

Figure 6:
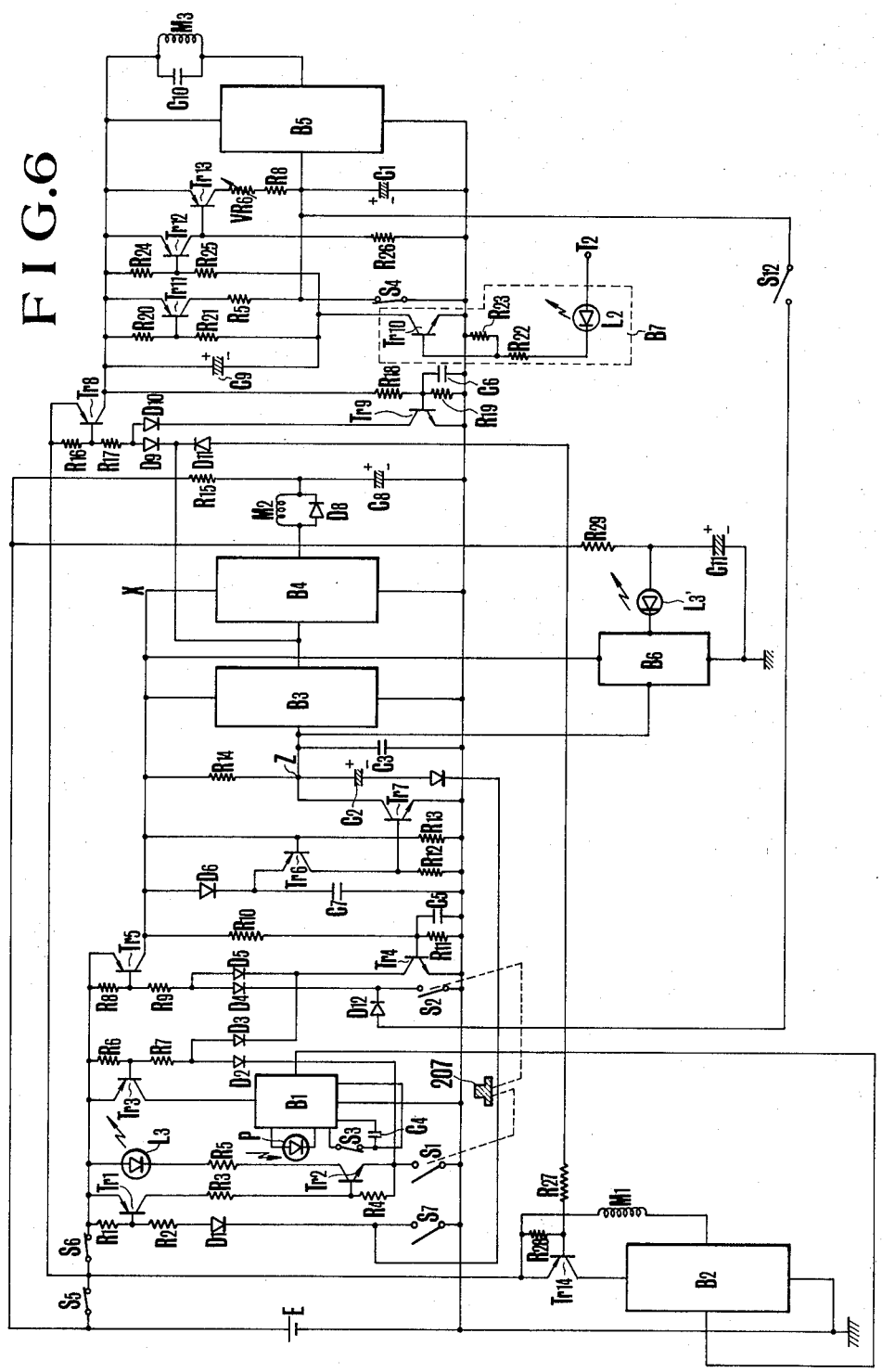
FIG. 6 is an electrical circuit diagram, partly in block form, showing the details of the various blocks of FIG. 5.
Figure 7:
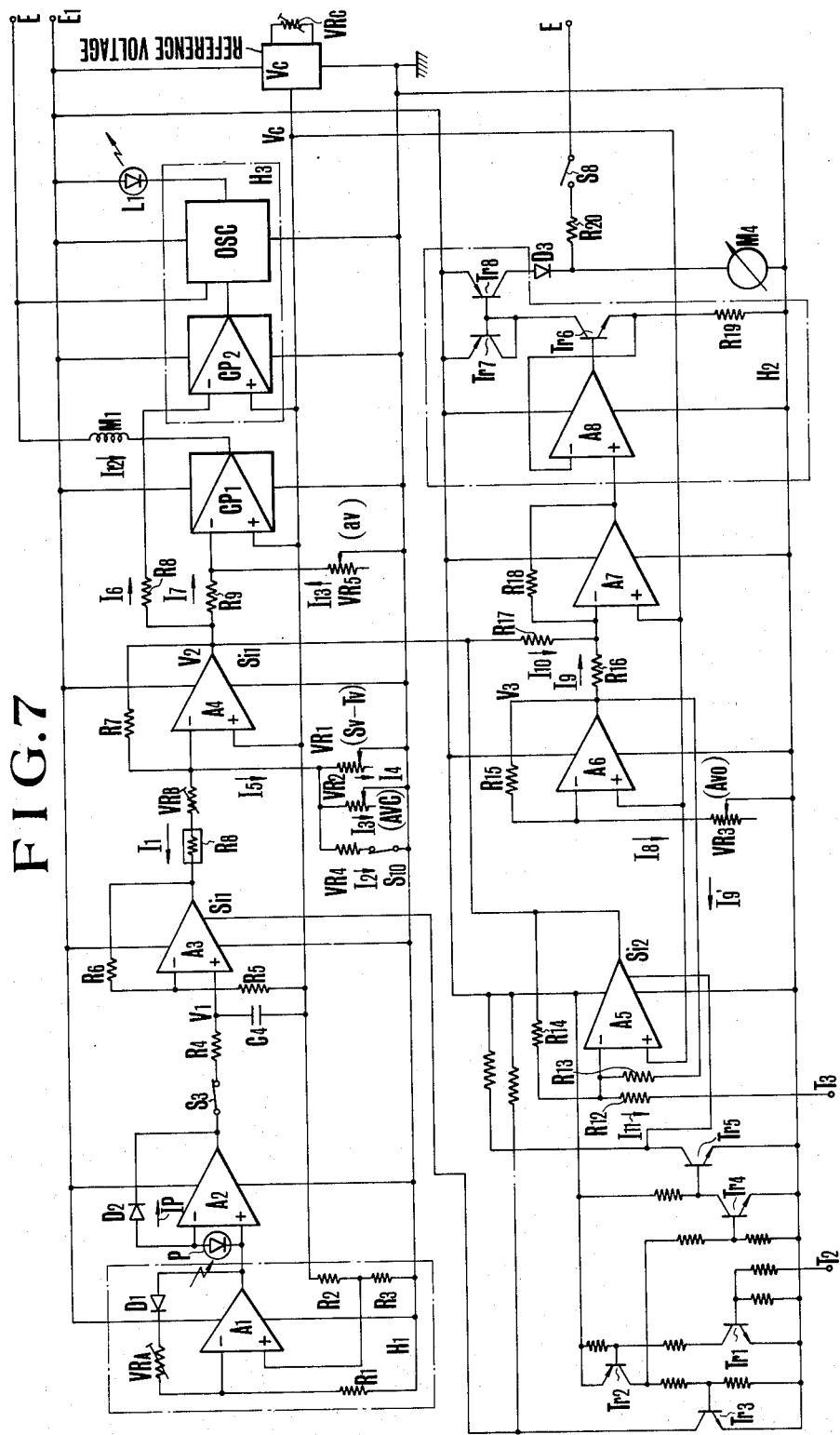
FIG. 7 is an electrical circuit diagram showing the details of the various blocks of FIG. 6.

FIG. 7 shows the electrical circuitry of the apparatus of FIG. 6 with the details of the blocks B1, B2, CC1 and CC2 thereof. In the figure, the same reference characters have been employed to denote similar parts to those shown in FIG. 6. A first voltage divider of resistors R1 and R2 is connected in series to a reverse current preventing diode D1 and therefrom to the self-timer control switch S7. Connected to a junction of the voltage divider R1 and R2 is a base of a transistor Tr1 with its collector connected to a second voltage divider of resistors R3 and R4. Connected to a junction of the second voltage divider is a base of a second transistor Tr2 of which the collector stage includes a light-emitting diode L3 and a resistor R5 connected in series with each other. The light metering circuit B1 is provided with a capacitor C4 on which the voltage proportional to the illuminance of an object to be photographed is stored just before a storage control switch S3 is opened in automatic response to the initiation of upward movement of the quick return mirror 301 which is caused by energization of the electromagnet M2 when the shutter button 207 is depressed to a first stroke by which the switch S1 is closed. A third voltage divider of resistors R6 and R7 is connected in series to a reverse current preventing diode D2 and therefrom to the switch S1. The output of this voltage divider is applied to a base of a transistor Tr3 with its collector connected to control power supply of the block B1. To control power supply of the blocks B3 and B4, there is provided a switching circuit which comprises a transistor Tr5 having a base connected to a junction of a resistor voltage divider R8 and R9 which is connected through a reverse current preventing diode D4 to the switch S2, and a hold transistor Tr4 having a collector connected through a diode D5 to a point on connection between the voltage divider R8 and R9 and the diode D4 and having a base connected to an output of a resistor voltage divider R10 and R11, so that when the shutter release button 207 is depressed from the first to the second stroke to close switch S2 the transistor Tr4 is turned on to maintain the base potential of the transistor Tr5 at a low level and therefore that even when the release button 207 is returned to open the switch S2, the transistor Tr5 remains in the conducting state.

To secure a time interval necessary to perform reliable and accurate light metering between the actuation of shutter release and the initiation of operation of the camera, there is provided a delay circuit comprising a resistor R14 and a capacitor C3 and having a time constant of about 10 milliseconds. A self-timer time interval adjusting capacitor C2 is connected in parallel with the capacitor C2 and through a reverse current preventing diode D7 to the switch S7. These capacitors C2 and C3 are provided with respective discharge control transistors Tr6 and Tr7 in combination with a discharge time control capacitor C7. To achieve rapid energization of the starting electromagnet M2 there is provided an energy storing capacitor C8 which is charged through a resistor R15.

The output of block B3 is connected through a diode D11 and a resistor R27 to a base of a transistor Tr14 for controlling power supply of block B2. Block B6 has an input connected to the capacitors C2 and C3 to provide a preliminary display of the self-timer by a light-emitting diode L3' and is constructed in the form of a switching circuit having a conduction level slightly lower than that of a conventional one constituting the input stage of the block B3. The electrical energy for the light-emitting diode L3' is supplied from a capacitor C11, and the charge current thereto is controlled by a resistor R29.

A shutter control circuit includes a power supply control transistor Tr8 having a base connected to a junction of a resistor voltage divider R16 and R17, a hold transistor Tr9 having a collector connected through a diode D10 to the voltage divider R16 and R17 and having a base connected to a junction of a voltage divider R18 and R19, and first and second timing circuits for daylight and flash photography respectively. The first timing circuit comprises a variable resistor VR6 cooperative with the shutter dial 310, a fixed resistor R8 and a timing capacitor C1 connected in series with each other. The second timing circuit having a time constant of 1/60 second comprises a fixed resistor Rs and the common timing capacitor C1. Connected across the capacitor C1 is a start switch S4 which is arranged to be opened when the front shutter curtain runs down to the aperture open position. In order to select either one of the two timing circuits for connection with a switching circuit B5 in automatic response to the attainment of the voltage of the storage capacitor 115 (FIG. 3) to the normal firing level, there is provided a transistorized switching circuit comprising a first transistor Tr11 having a collector connected to the resistor Rs and having a base connected to a junction of a voltage divider R20 and R21, a second transistor Tr12 having a base connected to a junction of a voltage divider R24 and R25 and a third transistor Tr13 having a collector connected to the variable resistor VR6 and having a base connected to the collector of the second transistor Tr12. These two voltage dividers are connected to a common collector of a transistor Tr10 with its base connected through a resistor R22 and a display element or light-emitting diode L2 to the interconnection terminal T2 of the accessory shoe 204. When the transistor Tr10 is turned on, the first transistor Tr11 is turned on to connect the resistor Rs in series with the timing capacitor, while the second and third transistor Tr12 and Tr13 are turned on and off respectively to take the variable resistor VR6 and the fixed resistor R8 out of connection with the timing capacitor C1. As the lamp 121 is fired, the charge completion signal tends to disappear instantaneously, causing the camera to be switched from the flash to the daylight mode. To avoid this, there is provided a capacitor C9 connected between the collector of the transistor Tr10 and the positive bus.

When an exposure is to be made in the daylight mode without use of the self-timer, the operator will first turn the shutter dial 310 to select a desired shutter time. It is to be noted here that as the switch S7 is opened the capacitor C3 is selected to cooperate with the resistor R14 and therefore after the time delay of R14×C3 from the conduction of the transistor Tr5 the control block B3 is rendered operative, thereby the light metering operation is permitted to take a sufficient time for accurate and reliable exposure control.

Upon depression of the shutter button 207 to a first stroke, the switch S1 is closed causing the transistor Tr3 to be turned on with the start of power supply to the block B1. The photosensitive element P on which light entering through the interchangeable objective lens 202 is incident produces a voltage proportional to the level of brightness of the object being photographed and which is stored on a memory capacitor C4. Responsive to the voltage and other necessary exposure factors, the computer 308 produces an output representative of an exposure value or aperture value. Upon further depression of the shutter button 207 to a second stroke, the switch S2 is closed to turn on the transistor Tr5 and at the same time to turn on the hold transistor Tr4. As a result, a power supply to the blocks B3 and B4 is established. At the initiation of power supply, the transistors Tr6 and Tr7 are turned off to start charging of the timing capacitor C3 through the resistor R14. When the voltage on the timing capacitor C3 has reached a level slightly lower than the critical level for the switching circuit in block B3, the switching circuit in block B6 is rendered operative to energize the light emitting diode L3' from the energy already stored on the capacitor C11. After all the energy on the capacitor C11 has been discharged, the light-emitting diode L3' extinguishes itself, while the above mentioned diode L3 is de-energized when the switch S1 is opened, thereby the consumption of electrical energy is minimized. After the energization of the diode L3', a further increase of the voltage of the capacitor C3 occurs and leads to actuation of the switching circuit in block B3 which is followed by actuation of a mono-stable multivibrator B4. An actuating pulse of rectangular waveform is applied to the electromagnet M2, thereby the mirror control mechanism is operated to move the mirror upward. Actuation of block B3 also causes initiation of power supply to block B2 through the conducted transistor Tr14. As the mirror is moved upward, the latching lever 331 of FIG. 5 is moved to release the sector gear 330 with the start of scanning operation of the slider 332. The scanning result is compared with the exposure value from the computer 308 upon coincidence to energize the electromagnet M1 by block B2, causing the arresting lever 338 to engage with one of the teeth of the star gear. As the sector gear is operatively connected to the diaphragm mechanism, automatic adjustment of the diaphragm aperture is effected.

As the Schmitt type trigger circuit in block B3 is operated, the transistor Tr8 is actuated for conduction to start power supply to block B5. The transistor Tr13 is also turned on. At the termination of upward movement of the mirror 301, the latching lever 320 is operated to release the front shutter curtain from the cocked position. As the front curtain runs down, the switch S4 is opened to start charging of the timing capacitor C1 through the variable resistor VR6. At a point in time of full opening of the film gate 321, the synchro-switch S9 is closed. At the termination of duration of the preselected shutter time, the voltage on the timing capacitor C1 reaches the threshold level for the Schmitt type trigger circuit in block B5, thereby the electromagnet M3 is de-energized causing the rear shutter curtain to run down. At the initiation of running down movement of the rear shutter curtain, the switch S5 is opened to terminate the power supply to the various blocks as the transistors Tr5, Tr8 and Tr14 are turned off. Accordingly, the time interval of power supply to the various blocks is adjusted to minimum.

When an exposure is to be made in the flash mode, the flash unit will first be attached to the camera at the accessory shoe 204. The actual voltage stored on the storage capacitor 115 is detected by the voltage detector which includes the neon tube, and the output of the voltage detector is applied through the interconnection terminal T2 to the display diode L2 as shown in connection with FIGS. 3 and 4. As a result, the energization of the diode L2 causes the transistors Tr10 and Tr12 to be turned on, and the transistor Tr13 to be turned off and then causing the transistor Tr11 to be turned on to select the resistor Rs for connection with the timing capacitor C1. Thus, the block B5 is rendered responsive to the first timing circuit for flash photography. Subsequent operation proceeds in a manner similar to that shown in connection with the daylight mode.

FIG. 7 shows the details of the blocks B1 and B2 of FIG. 6 each of which will now be explained. At first, explanation is given to block B1. In the figure, A1 to A8 indicate operational amplifier circuits (hereinafter referred to as amplifier). Amplifiers A4 and A5 have terminals Si1 and Si2 for turning ON and OFF respectively when no signal is supplied from the flash unit B. Amplifier A2 constitutes a logarithmic converter together with a diode D2 and has a non-inversion input connected to a temperature compensating circuit enclosed within a dot-and-dash line block H1. A current generated in the photosensitive element P is logarithmically compressed by the converter and then applied through the memory switch S3 and a flicker preventing resistor R4 to the storage capacitor C4. The voltage stored on the capacitor C4 is amplified by a high-impedance buffer amplifier A3, and the output of amplifier A3 is applied through a temperature responsive resistor R8 and an adjustment variable resistor $VR_B$ to amplifier A4. Introduced into that amplifier A4 are exposure factors such as the difference (Sv−Tv) between the shutter time (Tv) and film speed (Sv), from a variable resistor VR1, the curvature correction (Avc) from a variable resistor VR2 and the K-value (K) from a variable resistor VR4. These factors are combined to form a current I5. The output of amplifier A4 is applied to a low light level display control circuit H3. When the light level as sensed by the element P is below the dynamic range of exposure control, an oscillator OSC is rendered operative to intermittently energize the display element L1. The output of amplifier A4 is also applied to amplifier A7 in the form of a current signal I10 which is combined with a current signal I9 from amplifier A6 to obtain an absolute aperture value (|Av|). This output (|Av|) is transferred to a meter driving circuit H2, by which the exposure meter M4 is controlled to display the computed exposure value. Tr1 to Tr3 are transistors connected in a switching circuit having an input connected to the interconnection terminal T2 at which the charge completion signal appears. The collector of transistor Tr3 is connected to the terminal Si1 of amplifier A4. A switching circuit including transistors Tr4 and Tr5 is connected to the terminal Si2 of amplifier A5 and functions to control ON and OFF operation of amplifier A5 in response to the signal from the terminal T2.

Next, explanation is given to the case where the charge completion signal appears at the terminal T2, that is, when the voltage on the storage capacitor reaches the normal firing level as described in connection with the FIGS. 3 and 4 embodiments. In this case, the transistors Tr1, Tr2 and Tr3 are turned ON by that signal so that amplifier A4 is rendered inoperative. On the other hand, the conduction of the transistor Tr2 causes conduction of Tr4 which in turn causes non-conduction of Tr5, thereby amplifier A5 is rendered operative. Thus the signal flow is switched from the normal metering system to the external diaphragm control system. The aperture information signal is applied from the terminal T3 to amplifier A5 in the form of a current I11 by the adjustment of the variable resistor 131 of FIGS. 3 and 4(b). This current is combined with the afore-said current I9' representative of the full open aperture value to produce a voltage V2 representative of the difference between the full open aperture value and the proper aperture value. This proper aperture value is displayed by the meter M4 in a manner similar to the above.

The block B2 of FIG. 6 is explained below by reference to FIG. 7. The afore-said diaphragm aperture difference voltage V2 is compared with the lens aperture difference (Av) signal to close down the diaphragm to a suitable position. The voltage V2 is converted by a resistor R9 to a current signal I7 which is applied to the comparator CP1. Also, the lens aperture difference signal resistor VR5 (FIG. 5) converts the voltage V2 to a current signal I13 which is also applied to the comparator. When these currents I7 and I13 coincides with each other, the AE control magnet is de-energized to set the diaphragm to a proper value.

The operation of the circuit of FIG. 7 in the daylight mode is as follows: Because of no signal from the flash unit, the accessory shoe is opened at the terminal T2. For this reason, A4 is turned on and A5 is turned off. When the shutter button is depressed to the first stroke, as shown above, the transistor Tr3 of FIG. 6 is turned on to apply a voltage at a point E1. For this reason, light incident upon the photosensitive element P causes production of a current Ip dependent upon the level of brightness of the object. This current Ip is logarithmically compressed by the log diode D2 and used as the output of amplifier A2 in charging the memory capacitor C4. The voltage V1 stored on the capacitor C4 is applied through the buffer amplifier A3, the temperature compensation resistor R8 and adjusting resistor VRB to the subsequent stage amplifier A4. The input current of amplifier A4 may be expressed as:

$$I1=(V1-VC)/(R8+VRB)$$

As I1 is obtained by the light metering at the full open aperture, we have $$I1 \propto (Bv-Avo-Avc)$$

The other currents entering amplifier A4 are:

$$I2=Vc/VR4 \propto \text{K-value}$$

$$I3=Vc/VR2 \propto +Avc$$

$$I4=Vc/VR1 \propto Sv-Tv$$

Therefore, the input I5 of amplifier A4 is:

$$I5=I4+I2+I3=Vc\,(1/VR1+1/VR2+1/VR4)$$

On the other hand, the currents I1 and I5 are summed up to obtain an output V2 which is proportional to the difference between the full open aperture value and the proper aperture value, that is:

$$I1 + I5 = \frac{V1 - Vc}{R8 + VRB} + Vc\left(\frac{1}{VR1} + \frac{1}{VR2} + \frac{1}{VR4}\right) \propto (Bv + Sv - Tv - Avo + K)$$

where $$V2=(I1+I5)\times R7+Vc$$

When the output V2 of amplifier A4 is larger than the reference voltage Vc, and when the output current I6 of amplifier A4 is equal to or larger than zero, wherein $$I6 = (V2 - Vc)/R8$$

$I6 \propto Bv + Sv - Tv - Avo + K \propto$ the aperture difference the low light level warning display LED control block H3 remains OFF so that the light-emitting diode L1 does not glow. Conversely when I6<0, because of the light value outside the normal range of exposure control, H3 is turned on to intermittently energize L1 by the output of the oscillator OSC.

The output V2 of amplifier A4 is added by amplifier A7 to the voltage V3 obtained by converting the current from the resistor VR3 by amplifier A6. On the other hand, because the variable resistor VR3 has been adjusted to a certain value dependent upon the maximum possible aperture of the associated lens, the current I3 flowing through the said resistor is:

$$I3 = Vc/VR3 \quad (\propto Avo)$$

As a result, the output voltage V3 of amplifier A6

$$V3 = I3 \times R15 + Vc \quad (\propto Avo \propto \text{Full open F-number})$$

The output V3 of amplifier A6 is applied through a resistor R16 to amplifier A7 with the resulting current I9 expressed as:

$$I9 = R15/R16 \times I8 \quad (\propto Avo \propto \text{Full open F-number})$$

The output voltage V2 of amplifier A4 is also applied through a resistor R17 to amplifier A7 with the resulting current input I10 expressed as:

$$I10 = \frac{V2 - Vc}{R17} \quad (\propto Bv + Sv - Tv - Avo + K \propto \text{computed aperture difference})$$

On the other hand, the input currents I9 and I10 are added by amplifier A7 with the result expressed as:

$$I9 + I10 = \frac{R15}{R16} \cdot I8 + \frac{V2 - Vc}{R17}$$
$$(\propto Bv + Sv - Tv - K \propto \text{Aperture value})$$

This added output is obtained from amplifier A7 and then converted to a current by block H2. This current is used to drive the meter M4. In the aforesaid case, as the meter M4 is also responsive to the output V2, when the diode L1 is intermittently lighted on, the position of the deflected pointer of the meter M4 indicates an incorrect exposure value. On the other hand, when the diode L1 does not glow intermittently, the adjusted value of diaphragm aperture is indicated as marginal.

Upon further depression of the shutter button to the second stroke, the automatic diaphragm setting magnet M1 is energized. Further, the member 331 of FIG. 5 is disengaged from the sector 330 so that the resistance value of the variable resistor VR5 is made variable by the presetting operation. For this reason, the output V2 of amplifier A4 and the current I13 of the variable resistor VR5 are added and applied to the comparator CP1. Since the currents I7 and I13 are adjusted in value by the resistor R9 and the variable resistor VR5 respectively, I7 and I13 may be expressed as:

$$I7 = (V2 - Vc)/R9 \quad (\propto \text{Computed aperture difference})$$

$$I13 = Vc/VR5 \quad (\propto \text{Actual aperture difference})$$

Therefore, the sum of currents I7 and I13 enters comparator CP1.

$$I7 + I13 = (V2 - Vc/R9) + (Vc/VR5)$$

wherein VR5 is varied by the sector gear 330. As the resistance value of VR5 is varied, when I7+I13>0, then comparator CP1 is ON to energize the electromagnet M1 by a constant current I12. When I7+I13≤0, then comparator CP1 is OFF to de-energize M1. At this time, the arresting lever 338 stops rotation of the star wheel.

It is to be noted that the foregoing process of computation may be performed in Apex unit. In this case, the current signal can be expressed as:

$$I = Vc/VR$$

wherein VR is the set value of VR1 to VR5.

If the resistance value R is varied as a function of the amount of displacement $\theta$, or $R = Ro/\theta$ we have $$I = Vc/Ro \times \theta$$

Accordingly, the output signal magnitude varies in linear manner with respect to the amount of displacement of factor setting variable resistor slide.

When the flash unit is used, amplifier A4 is turned off by the voltage appearing at the terminal T2, and amplifier A5 is turned off. The aperture control signal is given through the terminal T3. In this case, amplifier A5 computes with the aperture control signal from the flash unit and the full open F-number signal from the variable resistor VR3.

As shown in FIGS. 5 to 7, the automatic exposure control system is switched to the flash mode when the flash unit of FIGS. 3 or 4(a) is used. In this mode, upon attainment of the voltage of the storage capacitor to the normal firing level, the shutter of the camera is automatically operated with the predetermined flash exposure time, while the diaphragm of the camera is also automatically adjusted to the desired aperture value set in the flash unit. After the closure of the synchro-switch, the time interval of energization of the flash is controlled in accordance with the camera-to-subject distance as explained in connection with FIGS. 1 to 4.

Figure 8:
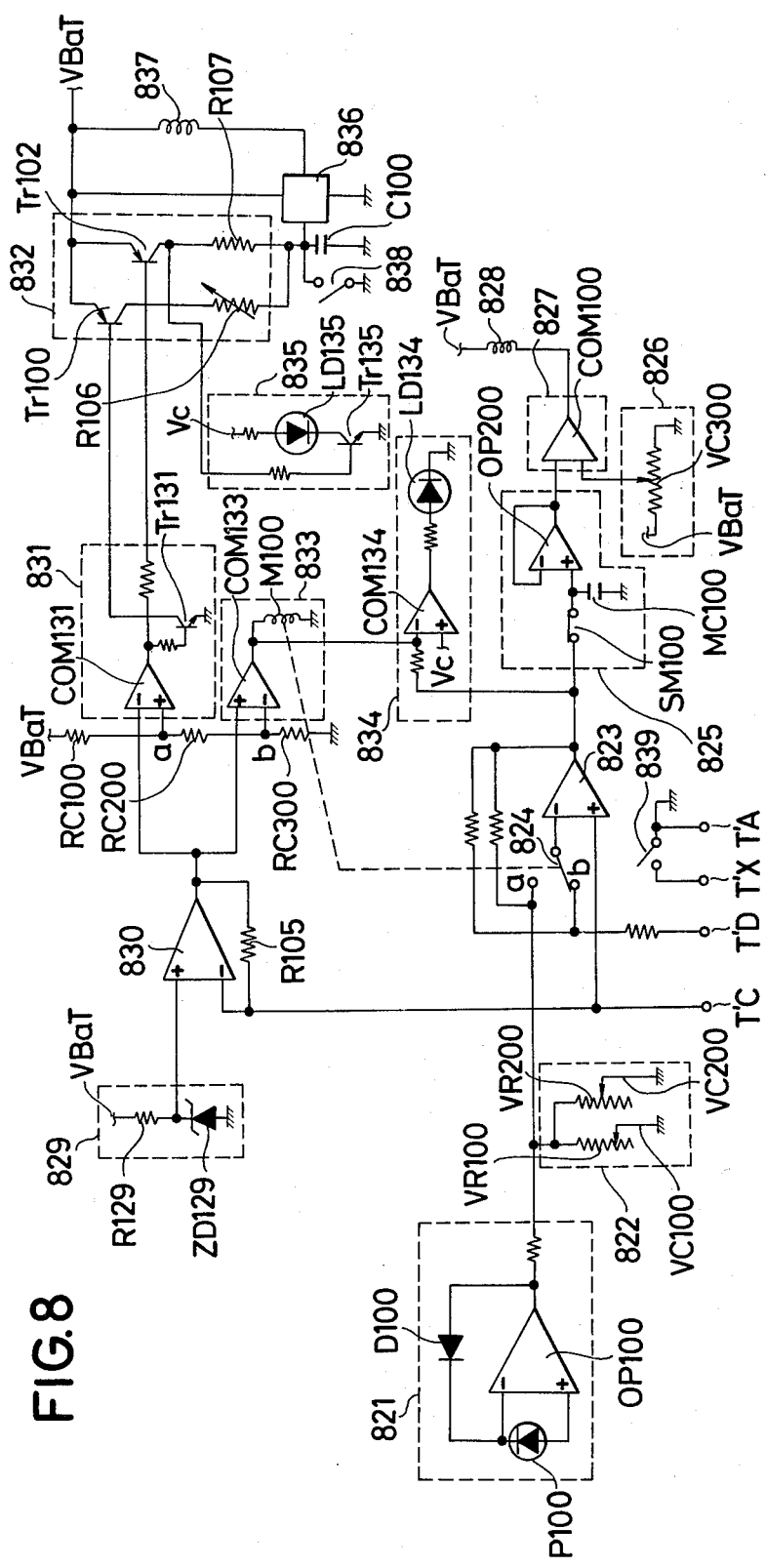
FIG. 8 is a schematic circuit diagram of another embodiment of a control circuit of a camera according to the present invention.

FIGS. 8 to 11 shows another embodiment of the present invention. In FIG. 8, that portion of a flash exposure control system which is incorporated in the camera is shown including a sensor 821 with a photosensitive element P100 connected between two inputs of an operational amplifier OP100. A diode D100 is connected in the feedback network of amplifier OP100. The output of sensor 821 is combined with the output of an exposure factor setting circuit 822 to produce an output representative of a daylight exposure value, in this instance, for automatic adjustment of the camera diaphragm of FIG. 11(a), as the sensitivity of used film and a preselected value of shutter speed are set in respective variable resistors VR100 and VR200 in block 822. This output is in the form of a voltage proportional to a diaphragm value and appears at a fixed contact, a, of a mode selector switch 824, while another fixed contact, b, receives a flash diaphragm control signal through an interconnection terminal, TD' from the flash unit of FIG. 9. A movable contact of switch 824 is connected to an inverting input of an operational amplifier 823 having an output connected to a memory capacitor MC100 through a control switch SM100, the latter being arranged to be opened just before a reflex mirror not shown is flipped up. Memory capacitor MC100 is connected at one pole to circuit earth, the opposite pole of which is connected to a non-inverting input of a buffer amplifier OP200. An inverting input of amplifier OP200 is connected to an output thereof. As a diaphragm presetting ring Pr of FIG. 11(a) is moving from the position corresponding to the full open aperture, a potentiometer 826 in the form of a variable resistor VC300 cooperative with a diaphragm scanning mechanism of FIG. 11(b) produces ever-varying output voltages which are compared with the output of exposure value memory circuit 25 by a comparator COM100 upon establishment of a certain relationship therebetween to produce an actuating signal for an electromagnet 828 controlling operation of diaphragm arresting means 1208 of FIG. 11(a).

A constant voltage circuit 829 comprises a resistor R129 and a Zener diode ZD129 connected in series to each other and to an electrical power source or battery VBaT. The output of circuit 829 is connected to an operational amplifier 830 at a non-inverting input thereof, while an inverting input of amplifier 830 is connected to an interconnection terminal TC'. A resistor R105 is connected between the non-inverting input and the output of amplifier 830, and constitutes a mode changeover control signal forming circuit together with the parts 829 and 830.

A first level detector 831 comprises a comparator COM131 having an input connected to the output of amplifier 830 and another input connected to a tap, a, of a voltage divider of series-connected resistors RC100, RC200 and RC300 and a transistor Tr131 with a base connected to the output of comparator COM131, with an emitter connected to circuit earth and with a collector connected to a base of a transistor Tr100 in a shutter control circuit 832. A base of a transistor Tr200 in circuit 832 is connected through a resistor to the output of comparator COM131. Which of transistors Tr100 and Tr200 is in the conducting state depends upon the output level of first detector 831. In the daylight mode, Tr100 is ON, and Tr200 is OFF. When the output of operational amplifier 830 has reached a critical level, Tr100 is turned off, the Tr200 is turned on. A second level detector 833 comprises a comparator COM133 having an input connected to the output of operational amplifier 830 and another input connected to a tap, b, of the voltage divider, and a relay coil 833 connected to the output of comparator COM133. When the output of operational amplifier 830 exceeds the critical level, the coil 833 is energized to move the mode selector switch 824 from "a" to "b" position.

A mode display circuit 834 comprises a comparator COM134 having an input connected to the outputs of comparator COM 133 and amplifier 823 and another input connected to a reference voltage source Vc, and a light-emitting diode LD134 connected to the output of said comparator COM134 through a resistor. This diode LD134 is positioned in the field of view of the camera finder to indicate the flash mode.

The afore-said shutter control circuit 832 further includes a variable resistor R6 cooperative with a not shown shutter dial and connected at one end thereof to the collector of transistor Tr100, the opposite end of which is connected to a timing capacitor C100, a fixed resistor R107 connected between the collector of transistor Tr200 and capacitor C100 and having a resistance value corresponding to a shutter time suited for flash photography, for example, 1/60 second. The collector of transistor Tr200 is connected through a resistor to a base of transistor Tr135 which constitutes a display circuit 935 together with a light-emitting diode LD135. This diode LD135 is connected between the collector of transistor Tr135 and the reference voltage source Vc and is set to emit light when transistor Tr200 is turned on.

The light-emitting diode LD135 is positioned in the field of view of the finder to display the fact that the shutter time is changed to the value for flash photography. Responsive to either one of the two timing circuits, a switching circuit such as a Schmitt type trigger circuit 836 produces an actuating signal for a solenoid of electromagnet 837 controlling operation of a rear shutter curtain not shown. Connected across timing capacitor C100 is a start switch 838 arranged to be opened when a front shutter curtain runs down to an aperture open position. TX' and TA' denote two additional interconnection terminals connected to a X contact 839 and arranged in an accessory shoe not shown on the camera housing together with the other terminals TC' and TD' to engage respective terminal TA to TC of the flash unit shown in FIG. 9.

Figure 9:
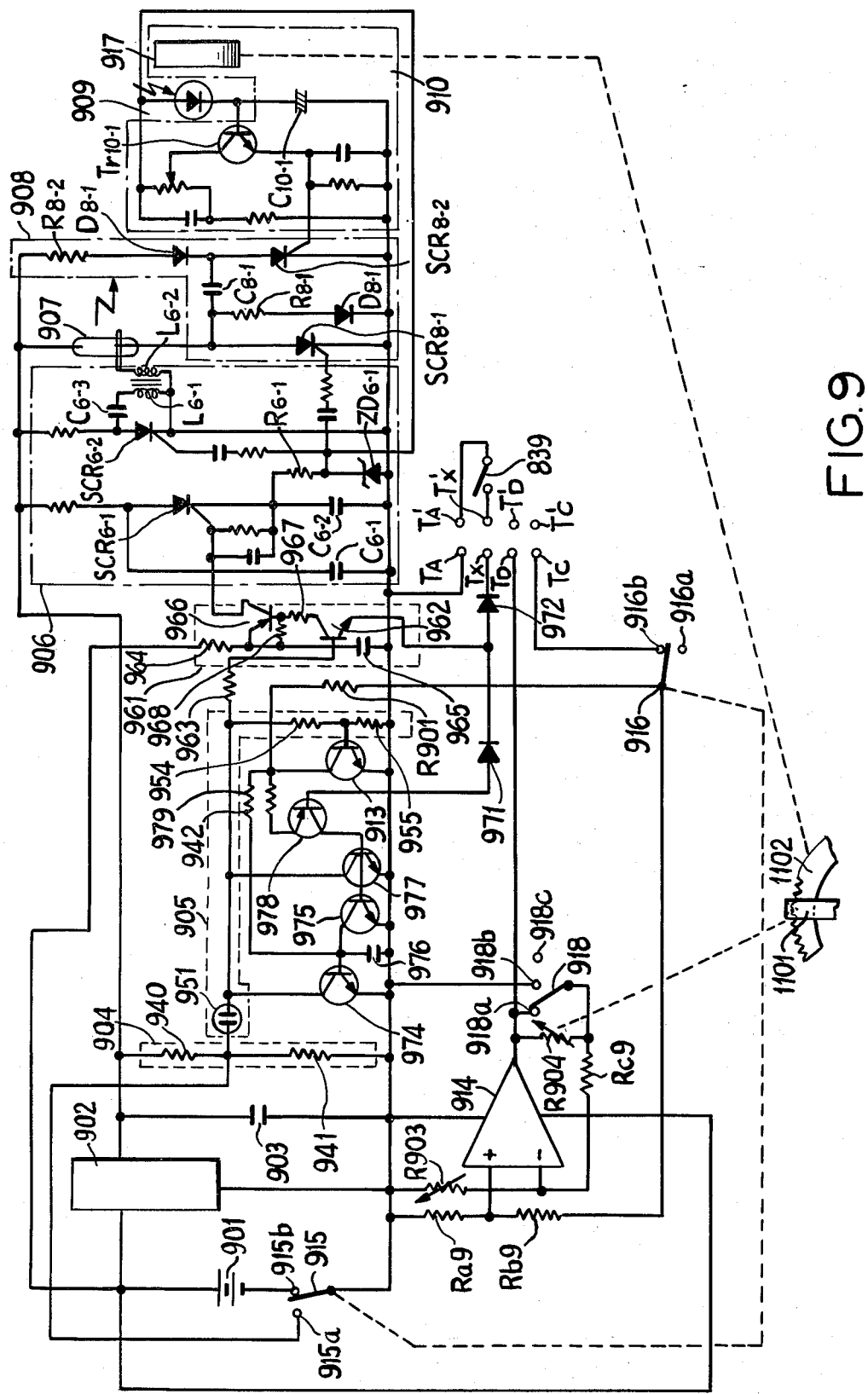
FIG. 9 is a schematic circuit diagram of a flash unit constituting the system of the invention together with the camera of FIG. 8.

FIG. 9 shows the circuitry of the computer type stroboscopic system or flash unit adapted for use with the camera of FIG. 8. An electrical power source or battery 901 connects across positive and negative buses through a switch element 915 which has two positions 915a and 915b for the flash and daylight modes respectively. The voltage of battery 901, after being increased by a booster 902, is applied to a main condenser for storage of flash convertible energy. The voltage stored on main condenser 903 is detected by a voltage divider 904 of series connected resistors 940 and 941 and displayed by a neon tube 951, as it is connected at its higher voltage electrode to the output of voltage divider 904 and at its lower voltage electrode to the negative bus through series-connected resistors 954 and 955. When the voltage on main condenser 903 has attained a critical level, the neon tube 951 is lit and at the same time a transistor 913 with a base connected to indicator 905 is rendered conducting to draw a current which flows through a resistor R901 to a switch element 916. This current serves as an actuating signal for the first and second level detectors 931 and 933 of the camera controlling selection of the flash and daylight modes. The switch elements 915 and 916 are assembled with each other to operate by a common actuator not shown.

A trigger circuit enclosed within the dot-and-dash outline 806 comprises a thyristor SCR6-1 having a gating control input connected to the collector of a transistor 966 which constitutes part of an actuation control circuit 961 to be described in details later, a first condenser C6-1 connected between the anode of thyristor SCR6-1 and the negative bus and previously charged through a resistor, a second condenser C6-2 connected between the cathode of thyristor SCR6-1 and the negative bus, a series circuit of resistor R6-1 and a Zener diode ZD6-1 connected across condenser C6-2, a second thyristor SCR6-2 having a gating control input connected through a condenser and a resistor to a point on connection between resistor R6-1 and Zener diode ZD6-1, and a transformer L6 of which the primary coil L-6-1 is cconnected between the anode and cathode of thyristor SCR6-2 through a condenser C6-3, the secondary coil L6-2 terminating at an external electrode of a discharge tube 907.

In order to insure that the closure of X contact 939 leads to initiation of firing of flash tube 907 only when simultaneous occurrence of the attainment of the voltage of main condenser 903 to the critical level and of the non-conducting states of transistors 974 and 977 to be described later is effected, there is provided the above noted actuation control circuit 961 comprising a first transistor 962 with a base connected through a resistor 963 to the indicator 905, with an emitter connected through a forward diode 972 to the terminal TX, and with a collector connected through resistors 967 and 968 to a point on connection between a resistor 964 and a condenser 965, and the second transistor 966 with a collector connected to the gating control input of thyristor SCR6-1 in the trigger circuit 906, with a base connected to a point on connection between resistors 967 and 968 and with an emitter connected to a point on connection between resistor 964 and condenser 965.

A discharge control circuit 908 for flash tube 907 comprises a first thyristor SCR8-1 connected between the cathode of tube 907 and the negative bus, and having a gating control input connected through a resistor and a condenser to the output of the afore-said Zener diode ZD6-1, and a commutation condenser C8-1 connected between the anodes of first and second thyristors SCR8-1 and SCR8-2 and previously charged through a series circuit of a resistor R8-2 and a diode D8-1 and through a series circuit of a resistor R8-2 and a diode D8-2.

At a time when the amount of flash light reflected from an object being photographed with either flash or complex illumination has reached a level for the correct flash exposure, the duration of firing of tube 907 is terminated by an adjusting circuit 910 which includes a condenser C10-1 constituting an integrator together with a photo-sensitive element 909. Connected to a point on connection between photo-sensitive element 909 and condenser C10-1, is a base of transistor Tr10-1 with an emitter connected to the gating control input of second thyristor SCR8-2 of the discharge control circuit 908. In order to adjust the light responsivility of the integrator in accordance with the selected combination of diaphragm aperture and film speed values, there is provided a neutral density-scale filter 917 arranged to be movable in front of the photo-sensitive element 909 in response to manual setting of a dial 1102 to be described in connection with FIG. 10.

An operational amplifier 914 has an inverting input connected to a film speed setting variable resistor 903 and also connected through a resistor Rc9 and a diaphragm value setting variable resistor R904 to an output thereof, and has a non-inverting input connected to a point on connection between resistors Ra9 and Rb9 whose resistance values are far larger than the aforesaid resistor R901 connected through the switch element 916 in series to the resistor Rb9. The variable resistor R904 is arranged to cooperate with an operating lever 1101 of the flash exposure computer of FIG. 10. A changeover switch 918 has three operative positions 918a, 918b and 918c for the manual, daylight and automatic flash modes respectively.

A resistor 942 is connected between the collector of transistor 913 and a base of faulty operation preventing transistor 974. The collector of transistor 974 is connected to the lower voltage electrode of neon tube 951. The base of a transistor 978 is connected through diodes 971 and 972 to the terminal TX, and its emitter connected through a high resistor 979 to the collector of transistor 913. The collector of transistor 978 is connected to the bases of transistors 975 and 977. The collectors of transistors 975 and 977 are connected respectively to the base of transistor 974 and the collector of transistor 974.

Figure 10:
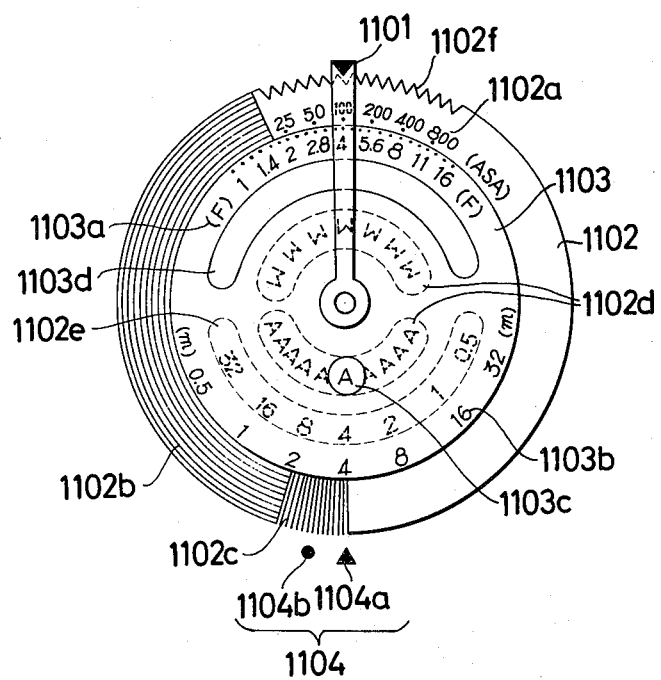
FIG. 10 is an elevational view of a calculation board of disc-shape.
Figure 11:
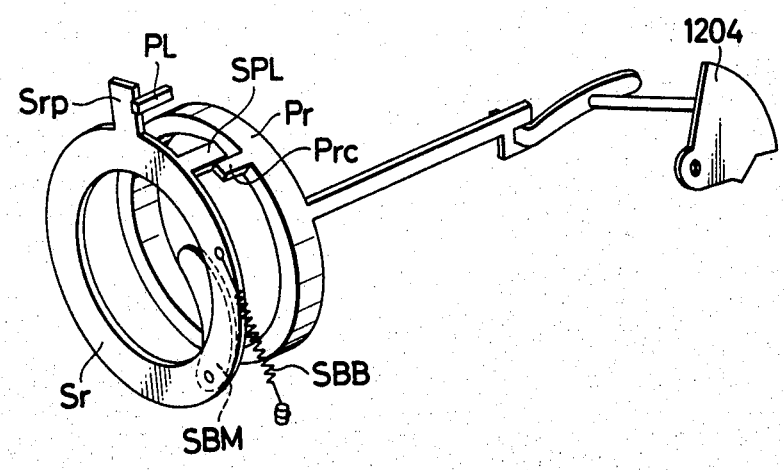
FIGS. 11(a) and 11(b) show the construction of an automatic diaphragm control mechanism operating with the circuit of FIG. 8.

FIG. 10 shows an example of the flash exposure computer with a manually operable mechanism for setting the required values of diaphragm aperture and film speed by taking into account the resultant range of camera-to-object distances for which the flash exposure control system of FIG. 9 can derive a correct exposure value. This mechanism includes a stationary disc 1103 having a diaphragm scale 1103a formed in a marginal portion thereof, an opposite marginal portion of which carries a distance scale 1103b in meter. The disc 1103 is provided with a round window 1103c and an arcuate window 1103d which are diametrically opposed to each other and through which either of symbols A and B for the automatic and manual modes respectively and an additional distance scale 1102e can be viewed respectively. The above-mentioned dial 1102 is rotatably mounted under the stationary disc 1103 is concentric relation thereto and has a film speed scale 1102a, and two hatched marginal portions 1102b and 1102c arranged upon registry of the sensitivity in ASA of used film with a desired diaphragm value to indicate the effective parts of the distance range 1103b when the main condenser 903 of FIG. 9 is charged to the critical voltage level and to the maximum possible level respectively, provided that the flash mode is set to be automatic as shown in FIG. 10. In the manual flash mode, the dial 1102 is turned to place the required value of film speed in registry with either of index marks 1104a and 1104b when the associated objective lens of the camera has either a standard focal length or a wide angle one, respectively, the latter requiring use of a wide adapter at flash tube 507. Whilst the diaphragm value setting resistor R904 of FIG. 9 is operatively connected to the lever 1101 of transparent material pivotal at the center of the disc 1103 and extending over both of the scales 1103a and 1102a and beyond out of the outer diameter of the dial 1102, the filter 917 is driven by the dial 1102 to be increased in density as the dial 1102 is turned in a clockwise direction. To facilitate maintenance of the lever 1101 in the once set position, there is provided a toothed position 1102a formed on the periphery of the dial 1102.

FIGS. 11a and 11b shows an example of an automaic diaphragm control mechanism including a diaphragm setting ring Sr which is biased by a spring SBB to tend to turn in a clockwise direction from a position where the diaphragm aperture defined by blades SBM is at the maximum size as latched by a pin PL. The setting ring Sr has a lug SPL movable into engagement with a stop lug Srp on a diaphragm presetting ring Prc. The presetting ring Prc controls the position of setting ring Sr during the actual process of seeking the proper diaphragm aperture through intermediary shown in FIG. 11b.

When a shutter release button 1202 is depressed, a latch 1203 is disengaged from a sector gear 1204 and then the latter starts to turn in a clockwise direction while a speed increasing gear train 1205, 1206 and 1207 is driven to rotate. The sector gear 1204 has a radially extending arm SP serving as a slider of the variable resistor Vc300 of FIG. 8. When the output of variable resistor Vc300 detected by the comparator COM100 has reached a level dependent upon either the preset or the computed value of diaphragm aperture, the electromagnet 828 is energized to arrest the gear train at the star wheel 1208. Such scanning result is introduced through a transmission shown in FIG. 11b to the presetting ring Pr.

The operation of the embodiment described in connection with FIGS. 8 and 9 is as follows:

First explanation will be made in connection with the daylight mode. As the flash unit was previously mounted on the camera housing with the terminals TA to TC connected to the terminals TA' to TC', the photographer will operate a power switch of the unit so that the switch element assembly 815 and 816 is set to their "a" positions where the terminal TC is in the open state. After a not shown power switch of the camera is closed to apply the voltage of system source to all the circuit portions, whilst the non-inverting input of operational amplifier 830 receives the constant voltage from 829, the inverting input of operational amplifier 830 receives no voltage from the terminal TC. Accordingly, the operational amplifier 830 produces an output voltage equal to that of the constant voltage source 829. Responsive to this output, the comparators COM131 and COM133 in the first and second level detectors 831 and 833 produce output signals of high and low levels respectively because of the higher potentials of the taps, a, and b, of the voltage divider RC100, RC200 and RC300, thereby the relay coil 833 is maintained deenergized to permit the switch 824 to stay in "a" position, and the transistor Tr131 is turned on to select the first transistor Tr101 for conduction. The outputs of the sensor 821 and the exposure factor setting circuit 822 are applied through the mode selector switch 824 to the operational amplifier 823 which then produces an output representative of an effective diaphragm aperture value. In other words, the output of sensor 821 is proportional to the logarithm of the level of brightness of an object being photographed that is, Bv is combined with the outputs of the variable resistors VR100 and VR200, which are proportional to the logarithms of the set values of shutter speed and film speed, that is, Tv and Sv, by the operational amplifier 823 for computation based on the formula Bv+Sv−Tv=Av. Thus, the output of the operational amplifier 830 corresponds to this Av value, and is stored in the memory capacitor MC100.

When the shutter release button 1202 of FIG. 11(b) is depressed to disengage the latch 1203 from the sector gear 1204, scanning operation of the slider SP on a resistance track mounted on the stationary framework of the camera starts to perform. When the output voltage of the variable resistor VC300 detected by the comparator COM100 coincides with the output voltage of the buffer amplifier OP200, the electromagnet 828 is energized to actuate the diaphragm arresting mechanism 1208 so that the star wheel 1207 gets stopped with the resulting angular position of the diaphragm presetting ring Prc depending upon the exposure value. Upon further depression of the button 1202, a not shown release mechanism of known construction is operated to actuate a not shown drive mechanism for a mirror M and to remove the pin PL away from the lug Srp of the setting ring Sr, thereby the mirror M is flipped up and the setting ring Sr is driven by the spring SBB to move to a position regulated by the stop pin Prc. When the mirror M flips up, the memory control switch SM100 is opened. In response to the depression of the button 1202, the front shutter curtain runs down in a manner known in the art to initiate an exposure. At the same time, the start switch 838 is opened. As mentioned above, whilst the second transistor Tr200 is in the non-conducting state, the first transistor Tr100 is in the conducting state, so that the timing capacitor C100 is charged through the variable resistor R106 of which the resistance value was adjusted by the shutter dial. At the termination of duration of a time interval equal to the set value of shutter time, the timing circuit R106 and C100 produce an output pulse which actuates the switching circuit 836 to release the rear shutter curtain from the latched position.

When use in the flash mode, the photographer will first turn the lever 1101 to place the index mark in registry with the value of film speed on the scale 1102a, and then the dial 1102 to place the value of diaphragm aperture in radial alignment with the value of shutter speed. After that, the dynamic range of camera-to-object distances can be indicated by the hatched portion 1102b when the neon tube 951 is lit and further by the other hatched portion 1102c when the main condenser 903 is fully charged. For example, the required values of film speed and diaphragm aperture are assumed to be ASA100 and F/4 respectively, then the dynamic distance range is found to be 2 meters for 1102b and 4 meters for 1102c. With alternate combination of the values of film speed and diaphragm aperture at ASA100 and F/2, the dynamic range is found to be 4 meters for 1102b and 8 meters for 1102c.

As the dial 1102 is turned along with the lever 1101 from a position for the combination of ASA100 and F/4 to ASA100 and F/5.6, that is, in a clockwise direction by one step, the density of filter 917 is increased by one step and the resistance value of resistor R904 is varied by one step. Thus, the selected combination of diaphragm value and shutter speed value is introduced into the flash exposure computer.

When the power switch is operated to set the switch elements 915 and 916 in their "b" positions, the voltage of the battery 901 after being increased by the booster 902 is applied to the main condenser 903. Upon attainment of the voltage of the main condenser 903 to the predetermined level at which the neon tube 951 starts to be lit, current is drawn from the base of the transistor 913 to render the latter to be conducting with simultaneous occurrence of flow of current through the resistor 901. In other words, as the switch element 916 is closed, a voltage produced across the resistor 901 is applied through the switch element 916 and through the terminal TC-and-terminal TC' connected to the inverting input of the operational amplifier 830 of FIG. 8, thereby the output of the operational amplifier 830 is changed from the lower to the higher level than those of the taps, a, and, b, and therefore the comparators COM131 and COM133 are actuated to produce output signals of low and high levels respectively. By the output of comparator COM131, the transistors Tr131 and Tr100 are turned off, and the transistor Tr200 is turned on to select the fixed resistor R107 for operative connection with the timing capacitor C100. The thus formed timing circuit R107 and C100 provide a shutter time of 1/60 second for flash photography. By the output of the comparator COM133, the coil 833 is energized to change the switch 824 from "at" to "b" position where the output of the operational amplifier 914 of FIG. 9 is applied through the terminal TD-and-terminal TD' connection to the memory circuit 825 provided that the switch 918 was set in "c" position. As the desired diaphragm value was set in the variable resistor R904 by manipulating the lever 1101 and the dial 1102 of FIG. 10, the output of the operational amplifier 914 is proportional to the logarithm of the set value of diaphragm aperture and stored in the memory condenser MC100. After the diaphragm information has been memorized in the condenser MC100, the shutter release may be performed. In a manner similar to that described in connection with the daylight mode, the diaphragm of the camera is adjusted in accordance with the memorized value of the condenser MC100, and then the front curtain runs down to initiate an exposure. At the start of running down movement of the front curtain, the synchro-contact 839 is turned on, and base current of the transistor 962 of the actuation control circuit 961 is allowed to flow through the resistor 963 from the display circuit 5. As the transistor 962 is turned on, base current flows through the transistor 962 to the base of the transistor 966 so that the transistor 966 is also turned on. At this time, as the condenser 965 was previously charged, the conduction of the transistor 966 causes the charge on the condenser 965 to suddenly flow through the emitter-collector of the transistor 966 to the gating control input of the thyristor SCR6-1 of the trigger circuit 906. As the thyristor SCR6-1 is gated on, the charge on the condenser C6-1 is transferred to the condenser C6-1 and therefrom discharged through the resistor R6-1 and the Zener diode ZD6-1. In consequence, a constant voltage appears across the Zener diode ZD6-1 for a predetermined time. Upon advent of this voltage on the gating control inputs of the thyristors SCR6-2 and SCR8-1, the charge on the condenser C6-3 is discharged through the primary coil of the transformer L6 to strike the discharge tube 907 with emission of flash light. The voltage of the Zener diode ZD6-1 also is applied to the flash adjusting circuit 910, thus the latter starting to operate at the time of firing of the tube 907. Light reflected from the object being photographed with flash illumination is received through the filter 917 by the photosensitive element 909. When the amount of light integrated by the integrator 909 and C10-1 has reached a predetermined level, the transistor Tr10-1 is turned on and the thyristor SCR8-2 is turned on, thereby the voltage on the commutation condenser C8-1 is applied to the thyristor SCR8-1 to terminate the firing of the flash tube 907. On the other hand, the camera shutter is controlled in accordance with the output of the timing circuit R107 and C100. During the actual exposure, the duration of firing of the tube is controlled as a function of the filter density and object brightness level to effect a correct flash exposure. Likewise as in the preceding embodiment, the dynamic range of distances is varied with film speed and diaphragm value.

Now assuming that the set values of diaphragm aperture and film speed by the setting mechanism of FIG. 10 were F/4 and ASA100 for the first exposure, and are then changed to F/5.6 and ASA100 for a second exposure, the lever 1101 and the dial 1102 are turned in the clockwise direction simultaneously to vary the resistance value of the resistor R904 by one step and also to increase the density of the filter 917 with increase in the flash duration, provided that the distance and brightness level of the object remain unchanged, while the dynamic range of distances is shortened. With ASA200 and F/4, the lever 1101 remains in the same position as with ASA100 and F/4 and the dial 1102 is turned from that position in the counter-clockwise direction by one step so that the density of the filter 917 is decreased by one step. Accordingly, the duration of firing of the flash tube 907 is controlled as being shorter than that when in the combination of F/4 and ASA100, provided that the distance and brightness level of the object remains unchanged, while the dynamic distance range is correspondingly extended.

As has been described in detail above, in the camera system of the present invention, when flash photography is performed with use of a computer type stroboscopic system, the light responsibility of the flash light sensor is adjusted in accordance with the combination of the set values of diaphragm aperture and film speed, while the camera diaphragm is automatically adjusted to the set value of diaphragm aperture in the stroboscopic system, thereby it is made possible to achieve a correct flash exposure regardless of what values are set for the diaphragm aperture and the film speed.

It will be seen from the foregoing that the present invention provides a flash exposure control system which enables the operator to shift the dynamic range of exposure control by taking into account the camera-to-subject distance. Such range control has been impossible with the conventional systems. This range can be adjusted as desired by suitable combination of film speed and aperture values. Therefore, the use of a faster film speed will lead to shift the flash range toward the longer distance side. The selected values of film speed and aperture are displayed in a combined form representing the flash range, thereby it being made possible for the photographer to avoid the use of marginal exposure factor values and therefore to increase the accuracy and reliability of flash exposure control.

What is claimed is:

1. A computer flash light device usable with a camera having an aperture control circuit which controls the aperture size on the basis of the value of the diaphragm aperture signal from the computer flash light device comprising:

(a) flash means for producing a flash light;
 (b) exposure information setting means including:
  (1) a non-movable plate provided with aperture value marks;
  (2) a first movable member provided so as to be movable relative to the non-movable plate, said member being set at a desired aperture value mark on the non-movable plate; and
  (3) a second movable member provided so as to be movable relative to the non-movable plate, said member being provided with film sensitivity marks so as to set the film sensitivity by setting the determined film sensitivity mark at the aperture value mark selected by the first movable member;
 (c) a flash light amount control circuit for controlling the amount of the flash light emitted by the flash means;
 (d) adjusting means coupled to said flash light amount control circuit, said adjusting means for adjusting said amount of the flash light controlled by the light amount control circuit as a function of the displacement position relative to the non-movable plate of the second movable member; and (e) a diaphragm aperture value signal forming circuit having an aperture value adjusting means which is coupled with the first movable member so as to adjust the aperture value as a function of the displacement position relative to the non-movable plate of the first movable member, said diaphragm aperture value signal forming circuit producing a diaphragm aperture signal having a value corresponding to the aperture value adjusted with the adjusting means.

2. A computer flash light device in accordance with claim 1, wherein the second movable member cooperates with the first movable member so as to determine the displacement position relative to the non-movable plate.

3. A computer flash light device in accordance with claim 1, wherein the flash light device including a main condenser for storing the flash light energy to be supplied to the flash means and a neon tube to be lit up when the charge value of the main condenser has reached a certain determined one, whereby distance value marks are provided on the non-movable plate, while first and second marks are provided on the second movable member in such a manner that the photographable distance range, when the neon tube is lit, is shown by means of the first mark while the photographable distance range when the main condenser has been fully charged is shown by means of the second mark.

4. A camera system comprising:
(A) a computer flash light device including:
 (a) flash means for producing a flash light;
 (b) exposure information setting means including:
  (1) a non-movable plate provided with aperture value marks;
  (2) a first movable member provided so as to be movable relative to the non-movable plate, said member being set at a desired aperture value mark on the non-movable plate; and
  (3) a second movable member provided so as to be movable relative to the non-movable plate, said member being provided with film sensitivity marks so as to set the film sensitivity by setting the determined sensitivity mark at the aperture mark selected by the first movable member;
 (c) a flash light amount control circuit for controlling the amount of the flash light emitted by the flash means;
 (d) adjusting means for adjusting the amount of the flash light controlled by said light amount control circuit as a function of the displacement position relative to the non-movable plate of the second movable member; and
 (e) a diaphragm aperture value signal forming circuit having an aperture value adjusting means which is coupled with the first movable member so as to adjust the aperture value as a function of the displacement position of the first movable member relative to the non-movable plate, said diaphragm aperture value signal forming circuit producing the aperture value signal having a value corresponding to the adjusted aperture value;
(B) a camera usable with the flash light device including:
 (a) a diaphragm aperture; and
 (b) a diaphragm aperture control circuit to control the diaphragm aperture for defining the aperture value, said circuit controlling the diaphragm aperture based on the signal from the diaphragm aperture value signal forming circuit.

5. A camera system in accordance with claim 4, wherein the second movable member cooperates with the first movable member so as to determine the displacement position relative to the non-movable plate.

6. A camera system in accordance with claim 4, wherein the flash light device includes a main condenser for storing the flash light energy to be supplied to the flash means and a neon tube to be lit up when the voltage of the charge in the main condenser has reached a certain determined value, whereby distance values are provided on the non-movable plate while a first and a second mark are provided on the second movable member in such a manner that the photographable distance range when the neon tube is lit up is shown with the first mark while the photographable distance range when the main condenser has been fully charged is shown with the second mark.

* * * * *